(12) United States Patent
Shober et al.

(10) Patent No.: US 6,253,138 B1
(45) Date of Patent: Jun. 26, 2001

(54) SHIFTING APPARATUS FOR AN AUTOMATIC TRANSMISSION INCLUDING A VEHICLE SECURITY SYSTEM

(75) Inventors: Joseph R. Shober, Phillipsburg, NJ (US); Michael J. Shober, Easton; Kevin Bradley, Pocono Pines, both of PA (US)

(73) Assignee: Shober's, Inc., Easton, PA (US)

( * ) Notice: Subject to any disclaimer, the term of this patent is extended or adjusted under 35 U.S.C. 154(b) by 0 days.

(21) Appl. No.: 09/263,476

(22) Filed: Mar. 5, 1999

(51) Int. Cl.[7] .................................................. B60K 41/18
(52) U.S. Cl. ............................. 701/51; 701/55; 74/866; 74/335
(58) Field of Search ................................. 701/55, 51, 68; 74/866, 335, 483

(56) References Cited

U.S. PATENT DOCUMENTS

| Re. 34,064 | 9/1992 | Tury et al. | 74/335 |
|---|---|---|---|
| 2,236,746 | 4/1941 | Bush | 74/334 |
| 2,610,518 | 9/1952 | Goedeke et al. | 74/365 |
| 2,658,403 | 11/1953 | Marco | 74/330 |
| 2,788,675 | 4/1957 | Hosea | 74/472 |
| 2,902,881 | 9/1959 | Loofbourrow | 74/473 |
| 3,001,618 | 9/1961 | McCordic et al. | 192/4 |
| 3,125,893 | 3/1964 | Bensinger | 74/472 |
| 3,780,597 | 12/1973 | White | 74/483 |
| 4,790,204 | 12/1988 | Tury et al. | 74/483 |
| 4,817,471 | * 4/1989 | Tury | 74/866 |
| 4,843,901 | 7/1989 | Peterson et al. | 74/335 |
| 4,922,769 | 5/1990 | Tury | 74/866 |
| 4,998,444 | 3/1991 | Mabee | 74/335 |
| 5,042,314 | 8/1991 | Rytter et al. | 74/335 |
| 5,085,106 | 2/1992 | Bubnash | 74/866 |

FOREIGN PATENT DOCUMENTS 60-176829  9/1985  (JP) .

* cited by examiner

Primary Examiner—William A. Cuchlinski, Jr.
Assistant Examiner—Arthur D. Donnelly
(74) Attorney, Agent, or Firm—Caesar, Rivise, Bernstein, Cohen & Pokotilow, Ltd.

(57) ABSTRACT

A shifting apparatus for use in a motor vehicle having an automatic transmission including a shift position select lever. The shifting apparatus includes an operator input means including a plurality of push buttons, each push button corresponding to desired transmission shift position. A generator means, operative in response to actuation of a push button, generates a signal representative of a desired transmission shift position. An actuator module, drivingly connected to the transmission shift position select lever, includes a variable resistance circuit which maintains a resistance value representative of the present transmission shift position. By reading the resistance value of the circuit, a comparator means can determine the present transmission shift position of the vehicle. Upon receiving an operator signal representative of a desired transmission shift position that is different from the present transmission shift position, the comparator means energizes the actuator module to move the shift position select lever to a position corresponding to the desired transmission shift position. The shifting apparatus of the present invention also operates in a security mode wherein a user code must be provided that matches one or more previously stored identification codes to start and operate the motor vehicle. Additionally, once a matching user code has been inputted, a security override key may depressed for a predetermined time interval to dispense with the necessity of re-entering a matching user code each subsequent time the vehicle is started for operation.

43 Claims, 28 Drawing Sheets

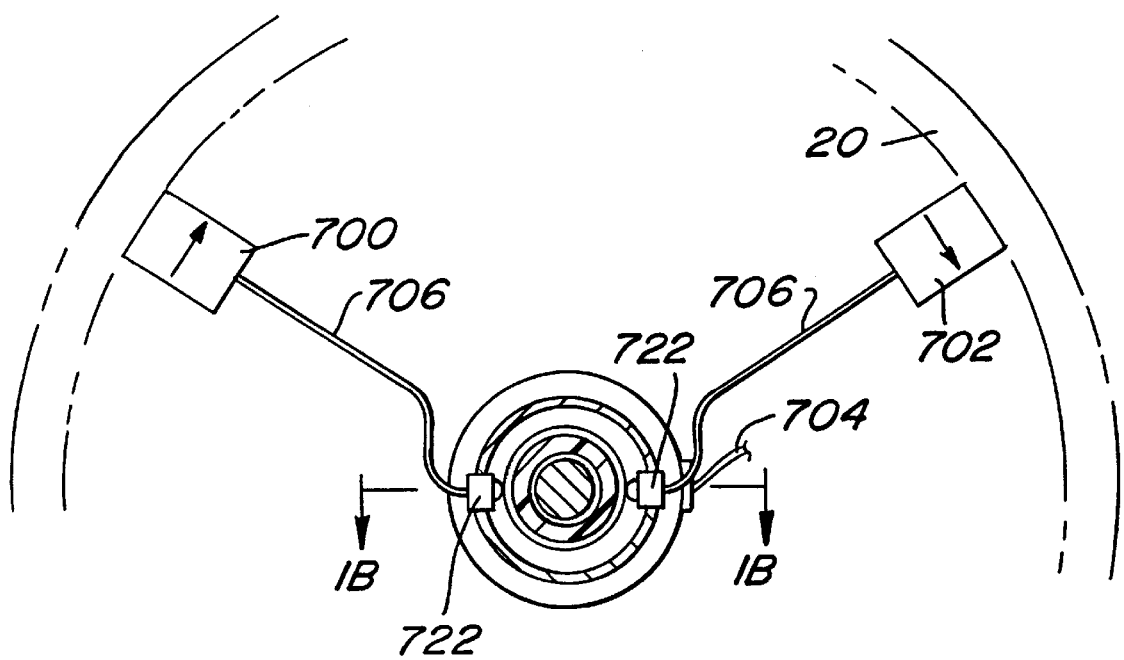
FIG. IA
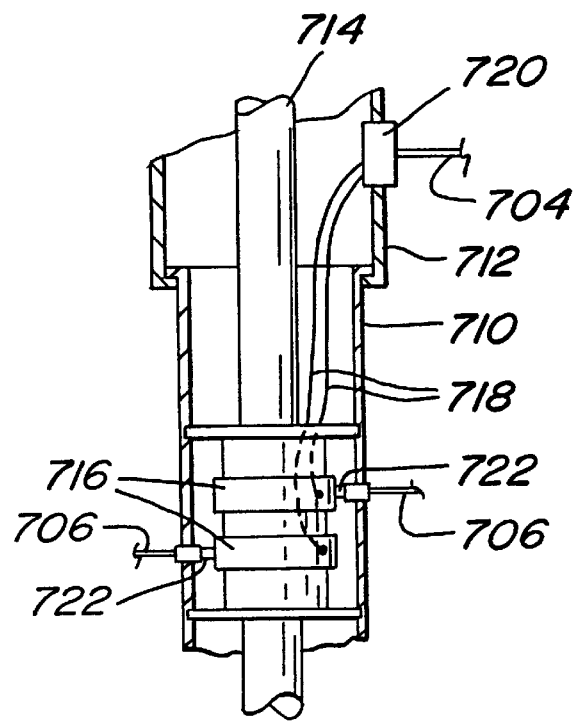
FIG. IB

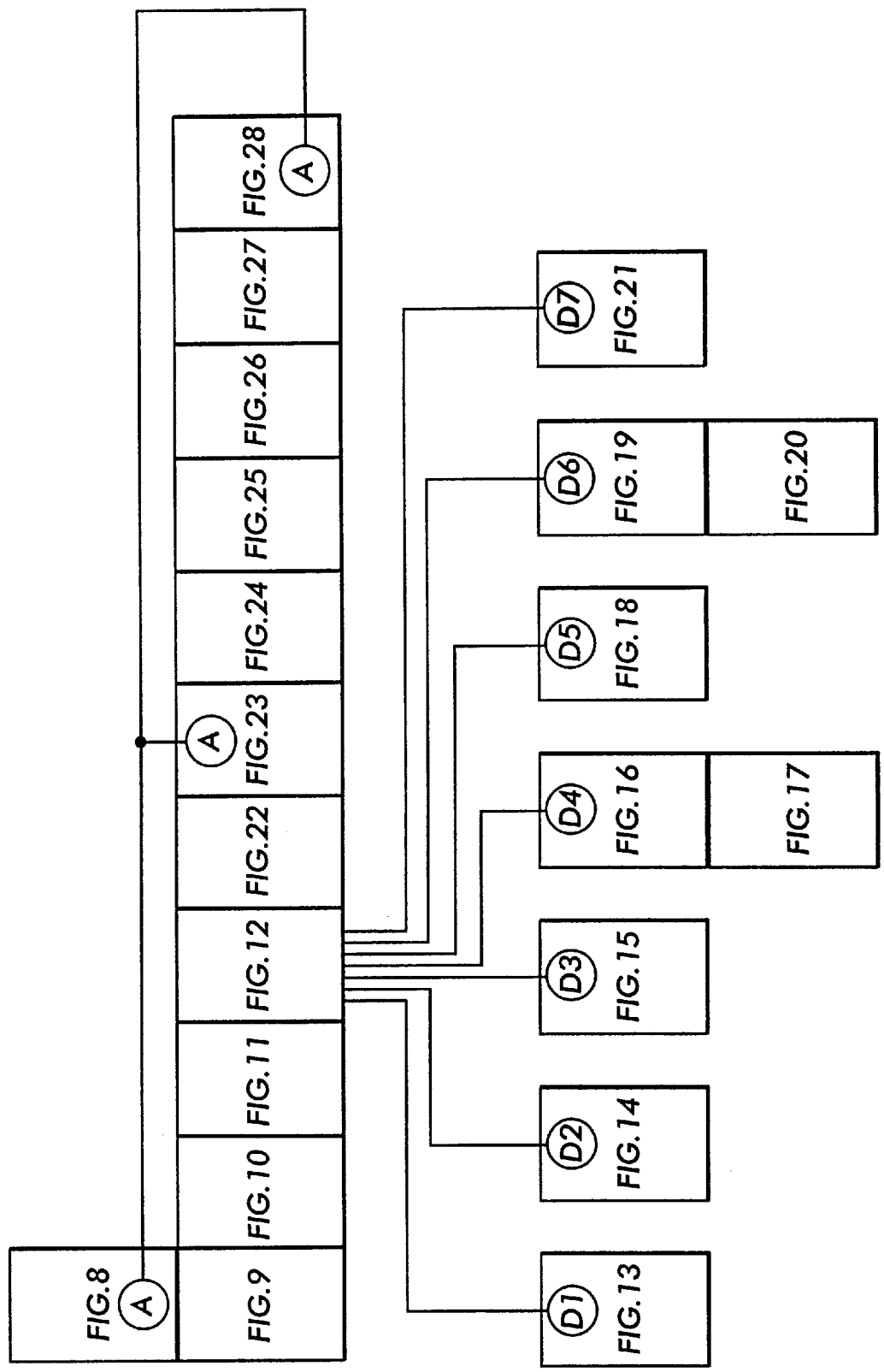

ns of the prior art;

SHIFTING APPARATUS FOR AN AUTOMATIC TRANSMISSION INCLUDING A VEHICLE SECURITY SYSTEM

BACKGROUND OF THE INVENTION

This invention relates to a shifting apparatus especially suited for use on motor vehicles having an automatic transmission.

Since their inception, motor vehicles have required a power train to transmit the force of the vehicle's engine to its wheels. The power train's main component is typically referred to as the "transmission". Engine speed and torque are converted in the transmission through the changing of gears to satisfy the requirements encountered during the typical duty cycle of a motor vehicle. Transmissions are generally referred to as manually actuated or automatic transmissions. Manual transmissions generally include mechanical mechanisms for coupling rotating gears to produce different ratio outputs to drive the wheels. Manual transmissions require an operator input from a shift lever or the like to effect each desired gear change ratio. More recently, automatic transmissions have become popular in which much of the shifting is done without operator input in response to a sensed speed and throttle opening parameters. Automatic transmissions typically include a shift position select lever on the transmission housing moveable between a plurality of selected positions corresponding to a respective plurality of shift positions within the transmission. The shift position select lever is moveable between its several shift positions by a cable or linkage mechanism extending from the shift position select lever to a suitable gear selector lever located in the passenger compartment of the vehicle. Typically, the gear selector is located adjacent the driver seat or, alternatively, on the steering column. Various proposals have been made in the past to eliminate the mechanical linkage between the driver operated gear select lever and the shift position select member and provide instead a shifting mechanism that responds to a driver actuated by sending an electrical signal to a power means arranged to move the shift position select member. While these proposals may overcome many of the disadvantages of the prior art, they nevertheless leave something to be desired from one or several standpoints. For example, under one of the proposals, U.S. Pat. No. 4,817,471, an electrical control system for control of an automatic transmission apparatus is set forth. The control system includes, among other things, a means for determining the present transmission shift position. The means includes an encoder wheel and a pick-up device. The encoder wheel is provided with a plurality of arcuate tracks and the pick-up device is provided with several flexible resilient contact fingers arranged for coaction with the arcuate tracks. Determination of the present transmission shift position is made through movement of the contact fingers and their rather complicated interaction with the arcuate tracks. Thus, there is a need in the art to provide a shifting apparatus that includes an improved means for determining the present transmission shift position.

Additionally, the shifting apparatus of the present invention may be operated in security mode. More particularly, under security mode, a user code must be provided that matches one or more previously stored identification codes to start and operate the motor vehicle. The security mode is provided with a feature wherein once a matching user code has been inputted, a security override key may depressed to eliminate entry of a matching user code each subsequent time the vehicle is started for operation.

OBJECTS OF THE INVENTION

Accordingly, it is a general object of this invention to provide an automatic transmission shifting apparatus which overcomes the disadvantages of the prior art;

It is a further object of this invention to provide an improved automatic transmission shifting apparatus;

It is a further object of this invention to provide a automatic transmission shifting apparatus that provides precise shifting;

It is a further object of this invention to provide a automatic transmission shifting apparatus that replaces the conventional pivotally mounted mechanical shift lever or linkage often located between the driver and passenger seats of the vehicle or located on the steering column of the vehicle;

It is a further object of this invention to provide an automatic transmission shifting apparatus arranged for installation as an aftermarket add-on as well as during vehicle manufacture;

It is a further object of this invention to provide an automatic transmission shifting apparatus that may be easily installed by hobbyists and car enthusiasts, It is a further object of this invention to provide an automatic transmission shifting apparatus that increases the available space within the interior of a motor vehicle;

It is a further object of this invention to provide an automatic transmission shifting apparatus that enables operation of motor vehicles by individuals unable to operate conventional shifting mechanisms; and, It is a further object of this invention to provide an automatic transmission shifting apparatus that is arranged for easy connection to off-the-shelf gages and indicators that are preferred and often purchased by street rod hobbyists.

It is a further object of this invention to provide an automatic transmission shifting apparatus that provides a security system for preventing unauthorized use of a motor vehicle.

It is a further object of this invention to provide an automatic transmission shifting apparatus that includes a vehicle security system which is responsive to a user inputted vehicle security code.

SUMMARY OF THE INVENTION

These and other objects of this invention are achieved by providing an automatic shift apparatus for use in a motor vehicle having an automatic transmission of the type that includes a shift position select lever. At this juncture, it is important to mention that although the embodiment of the invention described herein is intended for use on motor vehicles having an automatic transmission that go upon the land, e.g., automobiles, vans, trucks, etc., the present invention is not limited to such motor vehicles and may also be used on water craft having a transmission such as boats and the like. The shifting apparatus includes an operator input means including a plurality of push buttons, each push button corresponding to desired transmission shift position. A generator means, operative in response to actuation of a push button, generates a signal representative of a desired transmission shift position. An actuator module, drivingly connected to the transmission shift position select lever, includes a variable resistance circuit which maintains a resistance value representative of the present transmission shift position. By reading the resistance value of the circuit, a comparator means can determine the present transmission shift position of the motor vehicle. Upon receiving an operator signal representative of a desired transmission shift position that is different from the present transmission shift position, the comparator means energizes the actuator module to move the shift position select lever to a position corresponding to the desired transmission shift position. The shifting apparatus of the present invention also operates in a security mode wherein a user code must be provided that matches one or more previously stored identification codes to start and operate the motor vehicle. Additionally, once a matching user code has been inputted, a security override key may depressed for a predetermined time interval to dispense with the necessity of re-entering a matching user code each subsequent time the vehicle is started for operation.

DESCRIPTION OF THE DRAWINGS

Other objects and many attendant features of this invention will become readily appreciated as the same becomes better understood by reference to the following detailed description when considered in connection with the accompanying drawings wherein:

FIG. 1A is an enlarged, sectional view taken along line 1A—1A of FIG. 1;

FIG. 1B is an enlarged, sectional view taken along line 1B—1B of FIG. 1A;

FIG. 7 is a diagram illustrating the interrelationship between the various flowcharts explaining the operation of the present invention;

DETAILED DESCRIPTION OF THE PREFERRED EMBODIMENTS

Figure 1:
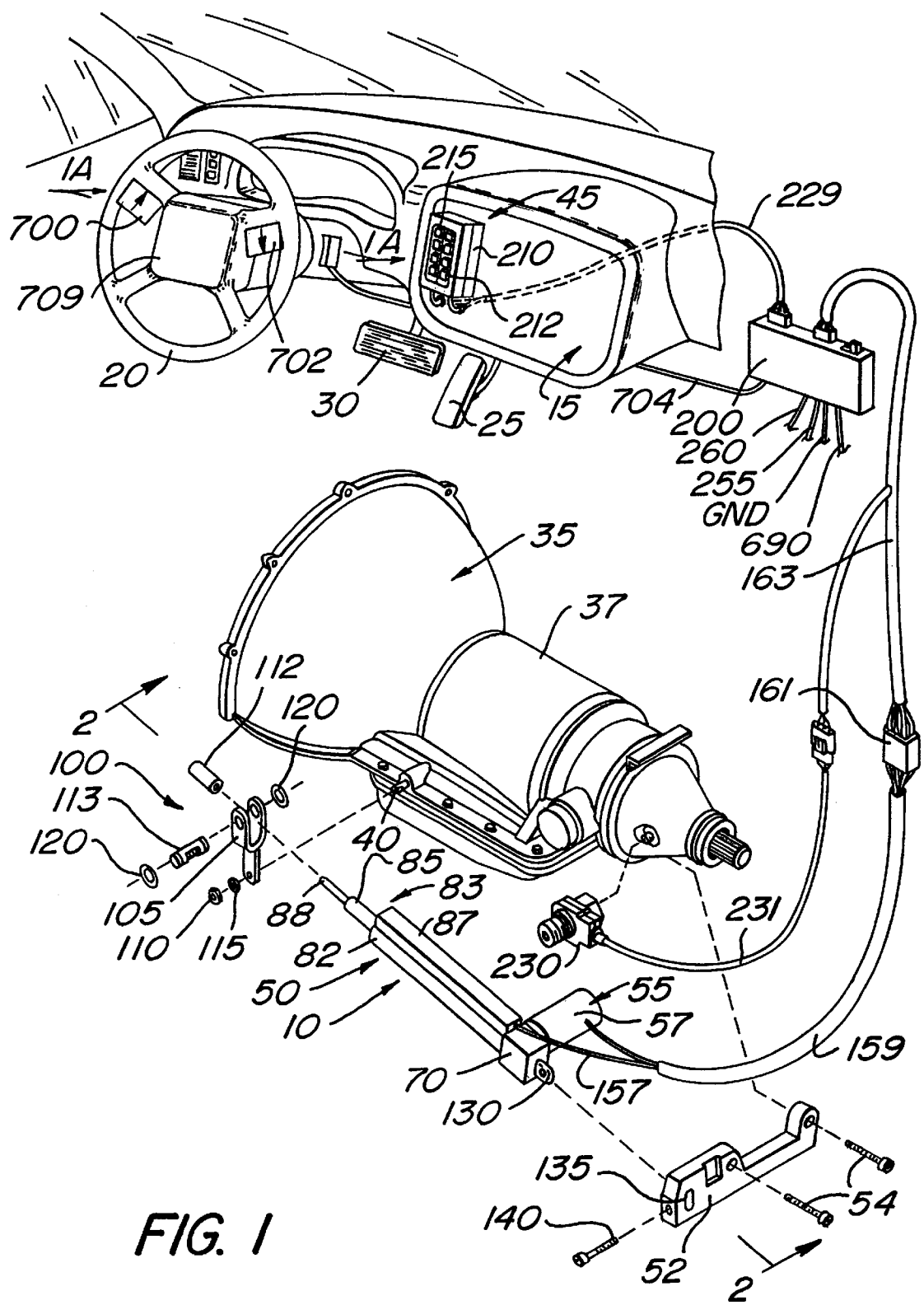
FIG. 1 is a fragmentary isometric view of a motor vehicle with the shifting apparatus of the present invention mounted thereto.

Referring now in greater detail to the various figures of the drawings wherein like reference numerals refer to like parts there is shown at 10 in FIG. 1 the shifting apparatus of the present invention in association with a motor vehicle of the type having an instrument panel assembly 15, a steering wheel 20, an accelerator pedal assembly 25, a braking mechanism 30 and an automatic transmission assembly 35. The transmission assembly 35 includes a housing 37 and shift position select shaft 40 having a rectangular free end. The shift position select shaft 40 is mounted externally to the transmission housing 37 and is provided for rotational movement. The transmission 35 is operable in a known manner in response to rotation of the shift position select shaft 40 to operate internal devices within the transmission to position the transmission in a plurality of transmission positions such as park, neutral, drive, reverse, etc.

Broadly stated, the shifting apparatus of the present invention includes a key pad module 45 and a actuator module 50 and a controller 200. The actuator module 50 is adapted to be bolted to the transmission housing 37 in proximity to the shift position select shaft 40. The key pad module 45 is adapted to be positioned in the interior of the motor vehicle for convenient operator access.

Figure 2:
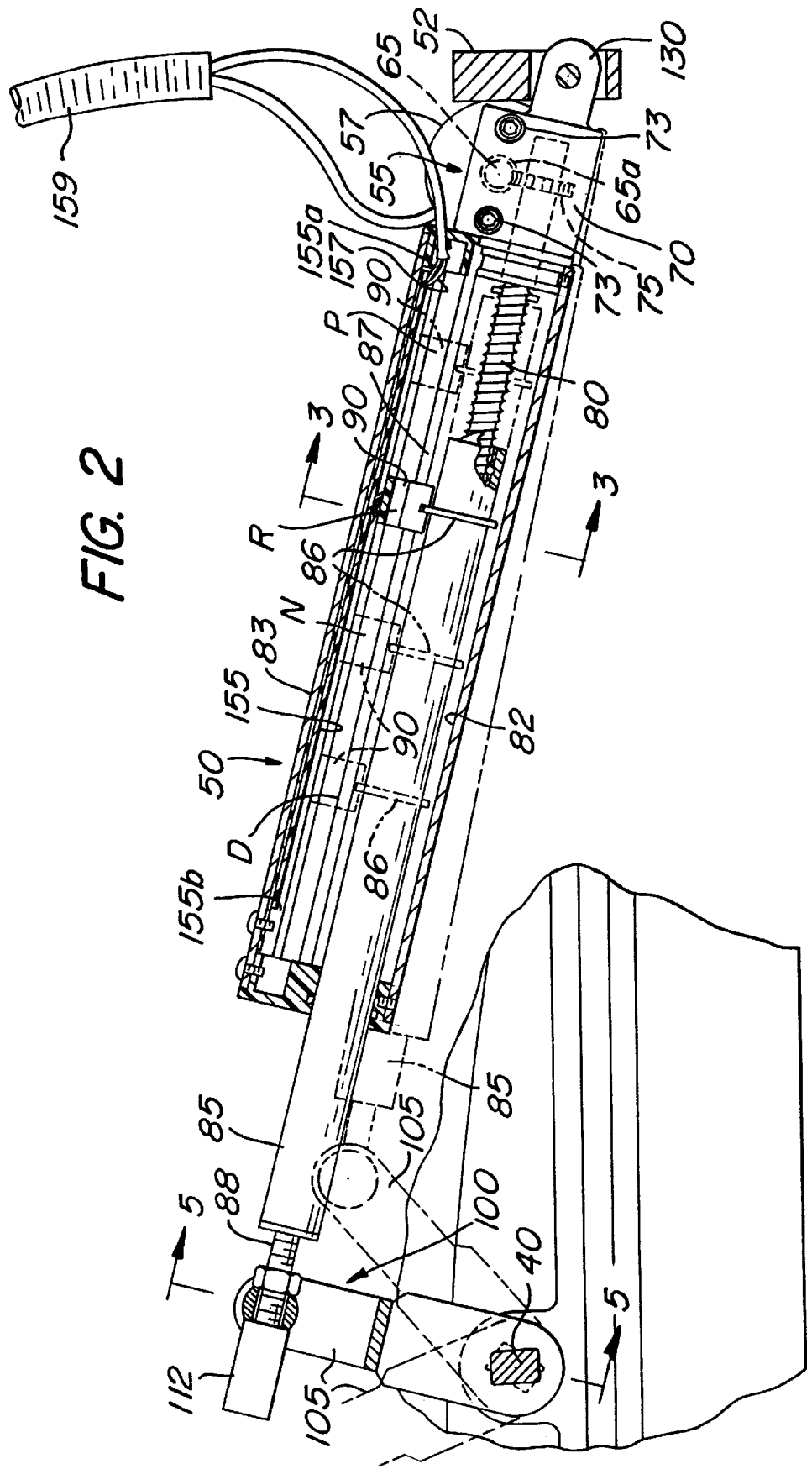
FIG. 2 is an enlarged, sectional view taken along line 2—2 of FIG. 1.

Referring now to FIGS. 1 and 2, the actuator module 50 is in the form of a motor assembly and includes a 12 volt DC electric motor 55 disposed within a housing 57. The use of a 12 V DC electric motor within the actuator module 50 is merely exemplary and other types of motors could be utilized within the scope of this invention. The DC motor 55 includes an output shaft 65 (shown in FIG. 2) which extends through the housing 57 and into the internal cavity of a speed reduction housing 70, the speed reduction housing 70 being mounted to the motor housing 57 by any suitable means, e.g., bolts 73. The shaft 65 includes a threaded free end 65a which acts as a worm wheel. A worm gear 75 positioned within the cavity of the speed reduction housing 70 is driven by the output shaft 65. As best shown in FIG. 2, the worm gear 75 is provided with a central opening and is fixedly secured to a threaded actuator shaft 80 which extends through the central opening of the worm gear 75. Thus, rotation of the worm gear 75 causes rotation of the threaded actuator shaft 80.

Figure 3:
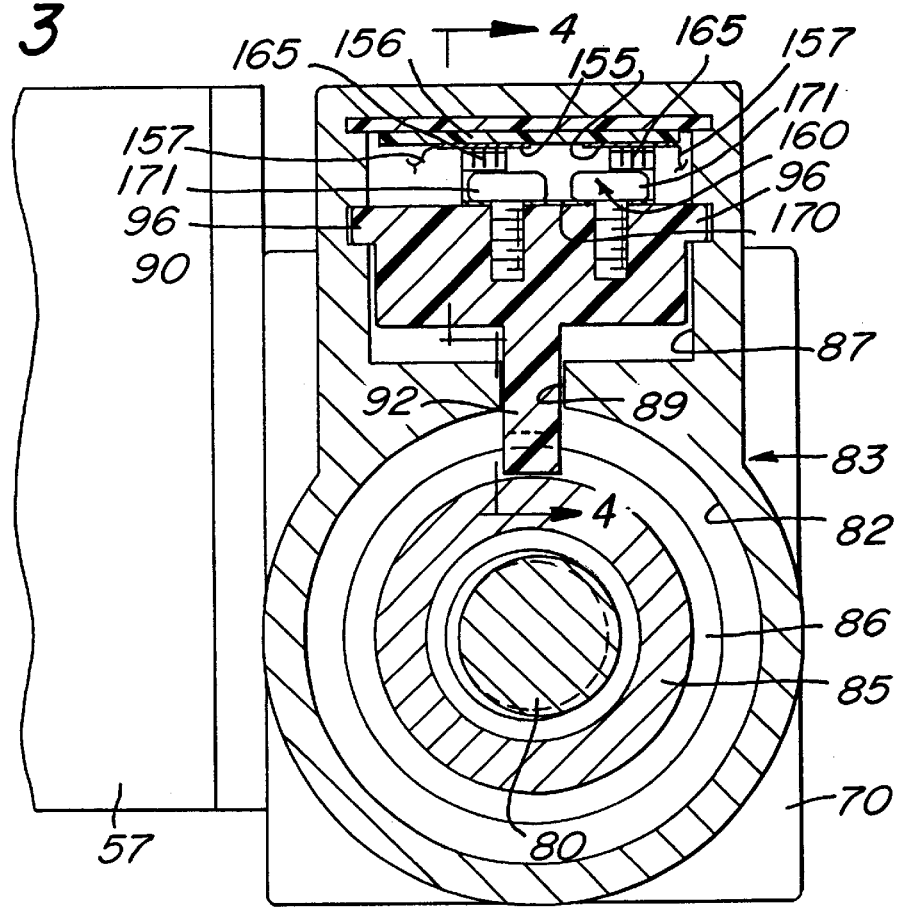
FIG. 3 is an enlarged, sectional view taken along line 3—3 of FIG. 2.

Referring now to FIGS. 2 and 3, substantially the entire length of the threaded actuator shaft 80 extends within a cylindrical opening 82 which forms a portion of an actuator housing 83 (best shown in FIG. 3). The actuator housing 83 also comprises a generally rectangular opening 87 which is in communication with the cylindrical opening 82 by means of a slot 89 that extends the length of the actuator housing 83. Also disposed within the cylindrical opening 82 is an internally threaded sleeve 85 which, as best shown in FIG. 2, is disposed over the externally threaded actuator shaft 80 and is in threaded engagement therewith. The free end of the internally threaded sleeve 85 includes a threaded shaft 88 which enables connection of the sleeve 85 to the shift position select shaft 40 by attachment to a yoke assembly 100 (best shown in FIGS. 1 and 2).

Figure 4:
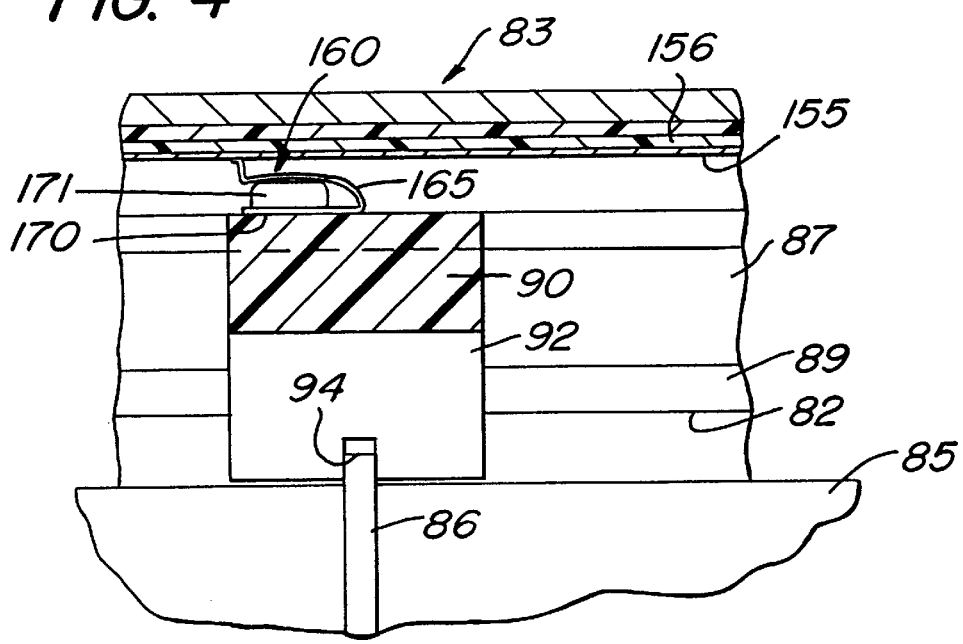
FIG. 4 is an enlarged, sectional view taken along line 4—4 of FIG. 3.

Referring now to FIGS. 2–4, the internally threaded sleeve 85 includes an upstanding collar 86 which surrounds the sleeve 85. As best shown in FIG. 3, a slidable element 90 is disposed within the rectangular opening 87 of the actuator housing 83. The slidable element 90 includes a pair of horizontally extending flanges 96, each flange being seated within a slot located on each side wall of the rectangular opening 87 of the actuator housing 83. In this manner, the slots form a track in which the slidable element 90 may freely travel by sliding back and forth over the entire length of the rectangular opening 87. The slidable element 90 also includes a vertical flange 92 which extends downwardly therefrom through the slot 89 in the housing 83. As best shown in FIG. 4, the vertical flange 92 is provided with a slot at 94 in which the upstanding collar 86 of the sleeve 85 is seated.

Extension of the vertical flange 92 through the slot 89 and its connection to the sleeve 85 prevents rotational movement of the sleeve 85. In this manner, rotational movement of the actuator shaft 80 causes the sleeve 85 to travel linearly within the housing 83 from a fully retracted position wherein substantially the entire length of the sleeve 85 is disposed within the housing 83 to a fully extended position wherein a major portion of the sleeve 85 extends outside of the housing 83. In FIG. 2, the sleeve 85 is shown in phantom in the fully retracted position and in solid lines in the extended position.

Figure 5:
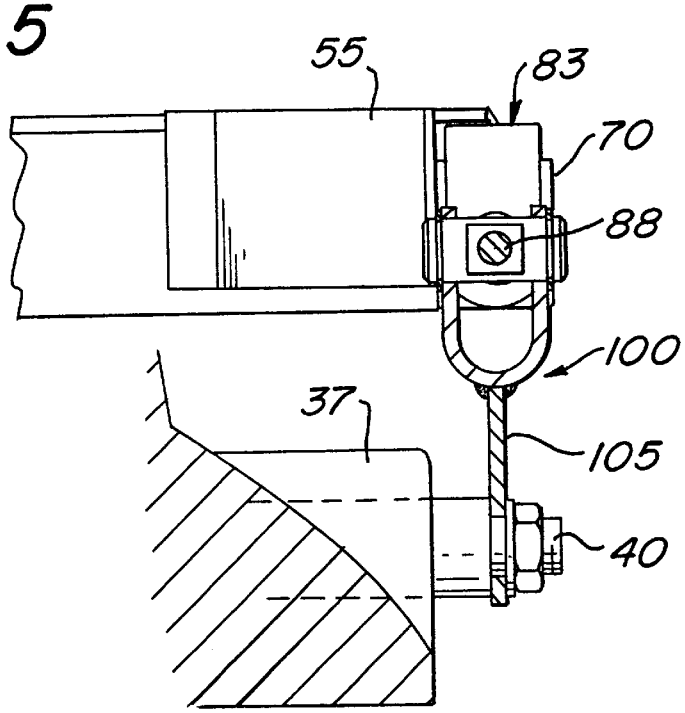
FIG. 5 is an enlarged, sectional view taken along line 5—5 of FIG. 2.

Referring now to FIGS. 1 and 5, the threaded shaft 88 located at the free end of the sleeve 85 is connected to the shift position select shaft 40 by attachment to a yoke assembly shown at 100. The yoke assembly 100 includes a Y-shaped bracket 105 and associated mounting hardware. As best shown in FIGS. 1 and 2, the lower end of the bracket 105, which includes a rectangular opening sized to fit over the rectangular-shaped shift position select shaft 40, is attached to the shift position select shaft 40 by any suitable mounting hardware, e.g., nut 110 and washer 115. The upper end of the bracket 105 is mounted to the threaded shaft 88 located at the free end of the internally threaded sleeve 85 by use of any suitable mounting hardware, e.g., sleeves 112 and 113 and washers 120. Thus, as best demonstrated in FIG. 2, travel of the sleeve 85 to predetermined positions between the retracted position and the extended position will cause rotation of the shift position select shaft 40 by predetermined amounts thus causing shifting of the transmission in known ways among the plurality of transmission shift positions, e.g., park, neutral, drive, reverse, etc.

Referring again to FIG. 2 as an example, with the sleeve 85 moved to the fully retracted position (indicated in phantom), the shift position select shaft 40 is caused to rotate clockwise to a first position that causes the transmission to shift to the park position. It should be understood that positioning of the sleeve 85 in the fully retracted position to cause shifting to park is a matter of design choice and positioning the sleeve 85 at positions other than the fully retracted position may be selected to cause shifting to park. If the sleeve 85 is caused to travel out of the housing 83 from the retracted position to a second predetermined position (indicated in solid lines), the shift position select shaft 40 will be rotated counterclockwise to a second position that causes the transmission to shift from the park position to the reverse position. Likewise, if the sleeve 85 is caused to travel outward of the housing 83 from the second predetermined position to a third predetermined position (not shown), the shift position select shaft 40 will be rotated counterclockwise from its second position to a third position thus causing the transmission to shift from the reverse position to the neutral position. Finally, if the sleeve 85 is caused to travel further outward of the housing from the third predetermined position to the fully extended position (not shown), the shift position select shaft 40 will be rotated counterclockwise from the third position to a fourth that causes the transmission to shift from the neutral position to the drive position and so on.

Figure 6:
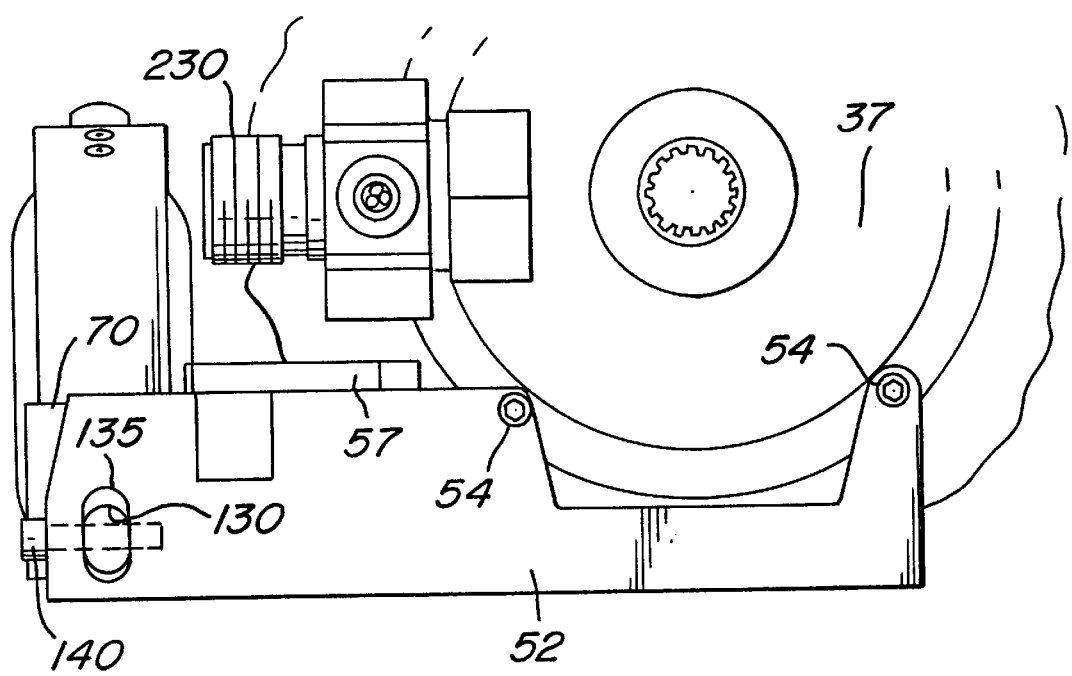
FIG. 6 is an enlarged view illustrating the manner in which a portion of the shifting apparatus of the present invention is mounted to a motor vehicle transmission.

As previously stated, the actuator module 50 is adapted to be bolted to the transmission housing 37 in proximity to the shift position select shaft 40. In particular, as best shown in FIGS. 1 and 6, a bracket 52 is provided that may be attached to one end of the transmission housing 37 by any suitable means, e.g., bolts 54. Further, the speed reduction housing 70 is provided with an eye-loop 130 secured to one face that is arranged for passage through a vertical through slot 135 located in the bracket 52. Once the eye-loop 130 is disposed through the slot 135, the actuator module 50 may be mounted to the bracket 52 by securement of the eye-loop therein by any suitable means, e.g., passage of a bolt 140 through the eye-loop 130.

As best shown in FIGS. 3 and 4, the actuator module 50 further includes a variable resistance circuit assembly housed within the rectangular opening 87 of the housing 83. The assembly includes a pair of conductive strips 155 disposed on the top wall of the rectangular opening 87. The conductive strips 155 are straight and substantially parallel and therefore are electrically isolated from one another. Referring now to FIG. 2, the strips 155 extend substantially the entire length of the housing 83 and include a near end indicated at 155a and a far end indicated at 155b. Referring again to FIGS. 3 and 4, a bridge assembly 160 mounted to the slidable element 90 serves as an electrical bridge between the strips 155 thus bringing them into electrical contact. The strips 155 may be formed of any suitable electrically conductive material, e.g., copper, and are attached to a non-conductive base strip 156 which is in turn attached to the top wall of the rectangular opening 87. The bridge assembly 160 includes a pair of flexible electrically conductive brushes 165 that are secured to the slidable element 90 by any suitable means, e.g., bolts 171. Importantly, the conductive brushes 165 are connected together by a conductive element 170 extending therebetween that is integral with the brushes 165. Each brush 165 is in electrical contact with one of the strips 155. The bridge assembly 160 is arranged for movement beneath the entire length of the strips 155 with the brushes 165 remaining in electrical contact with the strips 155 at all times.

As best shown in FIGS. 2 and 3, leads 157 are attached at the near end of the strips at 155a. The leads 157 extend into a cable assembly 159 which terminates in a pin type plug 161 (FIG. 1). A second cable assembly 163 extends from the pin type plug 161 to a controller assembly 200 in which a potentiometer (not shown) is disposed, the potentiometer measuring resistance over a predetermined range, e.g., between 0 and 9000 ohms. Referring now to FIG. 2, the potentiometer is provided to measure resistance over a portion of the strips 155 between the near end 155a and the bridge created by the bridging assembly 160. As best shown in FIG. 2, when the sleeve 85 is moved to the fully retracted position (as described previously), the transmission is shifted to park and the bridging assembly 160, disposed on the slidable element 90, is located at position P, corresponding to park. As previously mentioned, it should be understood that positioning of the sleeve 85 in the fully retracted position to cause shifting to park is a matter of design choice and positioning the sleeve 85 at positions other than the fully retracted position may be selected to cause shifting to park. When positioned at P, the portion of the strips 155 located between the near end 155a and the bridge formed by the bridging assembly 160 is relatively small and the resistance detected by the potentiometer over this portion is a relatively small amount, e.g., 750 ohms.

When the sleeve 85 is moved in the manner previously described from the fully retracted position corresponding to park to the first predetermined position corresponding to reverse, the slidable element 90 is moved from position P to position R, corresponding to reverse, thus increasing the length being measured between the near end 155a and the bridge formed by the bridging assembly 160. As the length between the near end 155a and the bridging assembly 160 increases, the amount of resistance measured by the potentiometer between these two points also increases, e.g., 1720 ohms. Thus, the resistance measured with slidable element 90 at position R is greater than that measured with the slidable element 90 positioned at P. Likewise, as the slidable element 90 is moved from position R to position N (corresponding to neutral) the amount of resistance measured by the potentiometer again increases, e.g., 2700 ohms. Finally, as the slidable element is moved from position N to position D (corresponding to drive) the amount of resistance measured by the potentiometer again increases, e.g., 3675 ohms, since the distance between the near end 155a and the bridging assembly 160 again increases. The slidable element 90 may be moved to additional positions corresponding with low 2 and low 1 (not shown). The potentiometer will measure different values associated with these positions, e.g., 4650 and 5625 ohms, respectively. In this manner, since the potentiometer will measure different resistance values for the different positions of the slidable element 90 over the strips 155, different potentiometer values may be associated with each of the locations of the slidable member 90 which represents each of the various transmission shift positions, i.e., park, reverse, neutral, drive, low 2 and low 1. Thus, as will be described later in this application, different potentiometer values may be assigned to the various transmission positions and stored in memory for later recall for shifting to a particular transmission position.

Figure 6A:
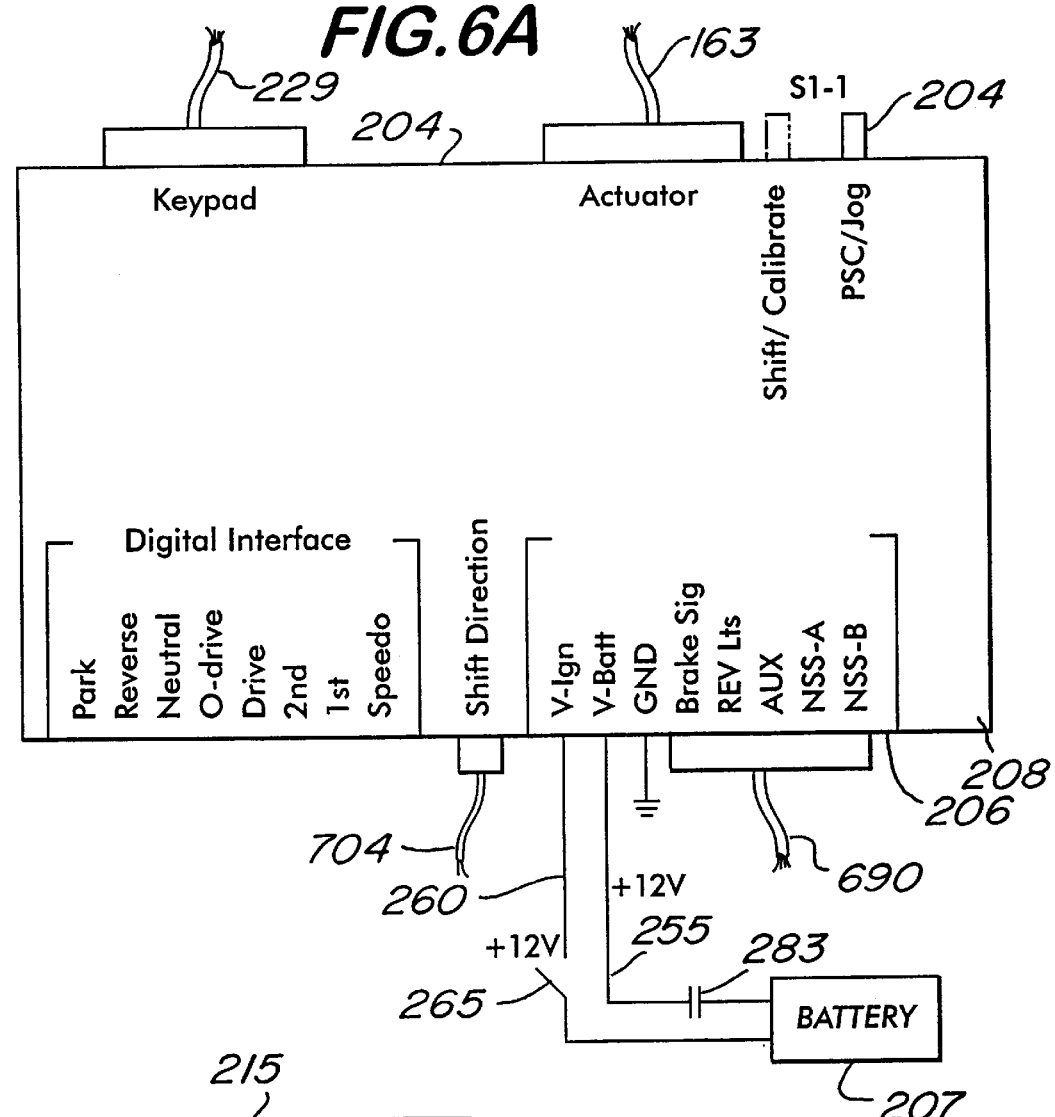
FIG. 6a is a top view of the controller used with the shifting apparatus of the present invention.
Figure 6B:
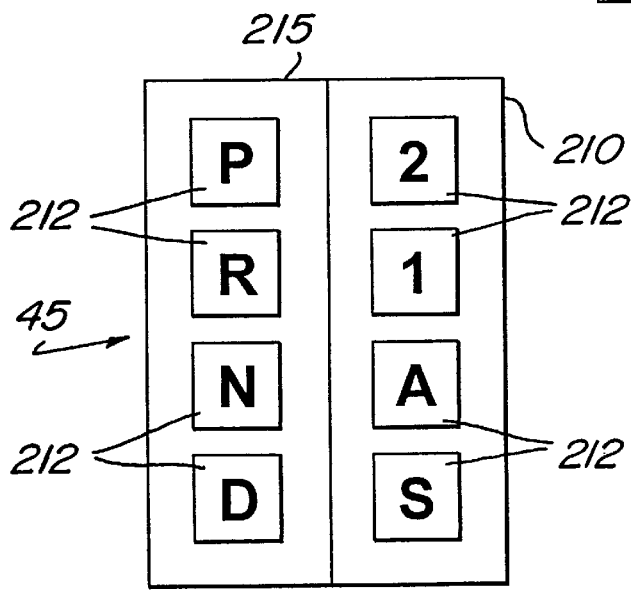
FIG. 6b is a front view of the key pad used with the present invention.

Referring now to FIG. 1 the key pad module 45 is intended for ready installation at a convenient location within the passenger compartment of the motor vehicle such as an opening within the instrument panel assembly 15 by insertion and fastening therein utilizing suitable hardware. The key pad module may be of any suitable material. Alternatively, the key pad module 45 may be laid on the vehicle seat or installed on an overhead console or headliner mounted to interior ceiling above and between the seats. One particularly effective key pad module 45 is manufactured by the Staco Company. Referring now to FIG. 6B, in the embodiment illustrated, the key pad module 45 includes a housing 210 of general box-like configuration which encloses a plurality of keys 212, e.g., eight individual keys, positioned on the front face 215 of the housing 210 in two columns. The keys 212 can take many forms, for example, the keys 212 can be mechanical switches or can be touch-sensitive or pressure-sensitive contact areas of a larger single panel. In the embodiment illustrated several of the keys 212 are designated to correspond to the available transmission shift positions. That is, "P" corresponds to the park position, "R" corresponds with the reverse position, "N" corresponds with the neutral position, "D" corresponds with the drive position, "2" corresponding with the low 2 drive position, and "1" corresponding with the low 1 drive position. In a Shift mode, to be discussed below, these keys are utilized for shifting the automatic transmission during operation of the motor vehicle. Specifically, by depressing a key corresponding to a desired transmission position, e.g., drive, while in Shift mode, the apparatus 10 will retrieve a potentiometer value from memory associated with that desired shift position and will operate the actuator module to move the shift position select shaft 40 until the desired transmission position has been reached. The "S" key corresponds with a Security Override feature to be explained fully below. "A" is an auxiliary key for providing power to an accessory, e.g., an additional passenger compartment lamp, add-on gages, etc. In two different security modes to be discussed below, all of the keys 212 are utilized to form possible access codes. The keys are also utilized in Jog and Calibrate modes which are utilized by factory personnel during installation of the shifting apparatus 10 to the motor vehicle transmission.

A display device such as a LCD or LED display is associated with each of the keys 212 and is provided to indicate the operating state of the key. For example, depending upon the mode in which the apparatus is set, an intermittently flashing display lamp may indicate that the apparatus is monitoring the key pad for a key press while a continuously illuminated lamp may indicate that the system has detected a key press. Intermittently flashing display lamps are also utilized under this invention to provide the driver with notification of possible hazardous operating conditions. Further, the controller 200 controls operation of an audible alarm mounted external from the controller, the audible alarm being arranged to emit either a continuous or an intermittent beep pattern to provide notification to the vehicle driver when certain operating conditions exist.

Referring again to FIG. 1, the key pad module 45 is in communication with the controller assembly 200 by means of a signal cable 229 extending therebetween. The keys 212 coact in known ways with a printed circuit board (not shown) located within the controller 200 to generate suitable electrical signals in response to respective depressions of the keys 212. The apparatus 10 further includes a vehicle speed sensor 230 that is arranged for mounting to the transmission housing and is operable to provide a vehicle speed signal to the controller 200 via a signal cable 231 which connects with cable assembly 163. Vehicle speed sensor 230 is preferably a rotational speed sensor operable to sense rotational speed of a tail shaft of the vehicle and provide a corresponding signal to the controller 200.

The controller 200 includes a central processing unit (CPU), preferably a programmable microprocessor (not shown) having software 203 recorded therein. The CPU is mounted to the printed circuit board (not shown). The controller 200 also includes other electronic components, e.g., capacitors, fail/safe relays, fuses, resistors, switches, diodes, etc., mounted to the printed circuit board and connected to the CPU through the circuit board. The CPU is also provided with permanent or non-volatile memory that retains data stored therein even when power to the memory device is shut off, e.g., an EEPROM. The controller receives signals from the key pad module 45, the variable resistance circuit assembly of the actuator module 50, the vehicle braking mechanism 30 and the vehicle speed sensor 230. Referring now to FIG. 6A, ports are provided on a side 204 of the controller to enable connection of the controller 200 to the key pad module 45 through cable 229 and to the actuator module 50 through cable assembly 163. The controller includes a face plate 208 bearing the designations "Actuator" and "Key Pad" in locations corresponding to the location of these ports. Further, a multi-socket terminal block 206 is provided on the opposite side of the controller 200 which enables a plurality of connections between the controller 200 and several vehicle components, i.e., power source (battery) 211, ground, braking mechanism, reverse lights, vehicle neutral safety switches and auxiliary components. These connections are designated on the controller face plate 208 as "V-Batt" and "V-Ign" for connection with a power source, e.g., the vehicle battery 211, "REV Lts" for connection with vehicle reverse lights, "Brake Sig" for connection with the vehicle braking mechanism 30, "GND" for connection to ground, "AUX" for connection to auxiliary accessories such as an additional passenger compartment lamp and "NSS-A" and "NSS-B" for connection as neutral safety switches.

As shown in FIG. 6A, the vehicle utilizes an ignition switch 265 which is operable to provide switched battery voltage (12 V) via the power line 260. The ignition switch 265 is preferably a known vehicle ignition switch having "off", "on" and "crank" positions. As is known in the art, the ignition switch 265 may be switched from the "off" position to the "on" position to thereby connect the controller 200 to the vehicle battery 211 via the power line 260. The ignition switch 265 may further be temporarily switched from the "on" position to the "crank" position to thereby start the engine. Once the engine is started, the ignition switch 265 typically returns automatically to the "on" position. The ignition switch 265 may be switched from the "on" position to the "off" position to thereby shut down the engine.

A switch 240 is located on the side of the controller 200 which is labeled S1-1. During calibration of the shifting apparatus 10 by factory personnel, the switch 240 is arranged to be toggled between the Jog and Calibrate modes. These modes are each indicated behind a slash "/" appearing in a designation on the face plate 208 of the controller 200. Once the shifting apparatus has been installed to the transmission housing, during normal operation, the switch 240 is arranged to be toggled between Program Security Code (PSC) mode and Shift mode. These modes are indicated before the slash "/" appearing in the same designation on the face plate 208 of the controller 200. Using software 203 stored in the memory, the controller 200 receives input codes from the key pad module 45, the vehicle braking mechanism 30, the variable resistance circuit assembly of the actuator module to provide suitable control signals for shifting of the automatic transmission, operation of the vehicle security system and other functions. The software may be written utilizing any suitable programming language, e.g., assembler language.

Figure 9:
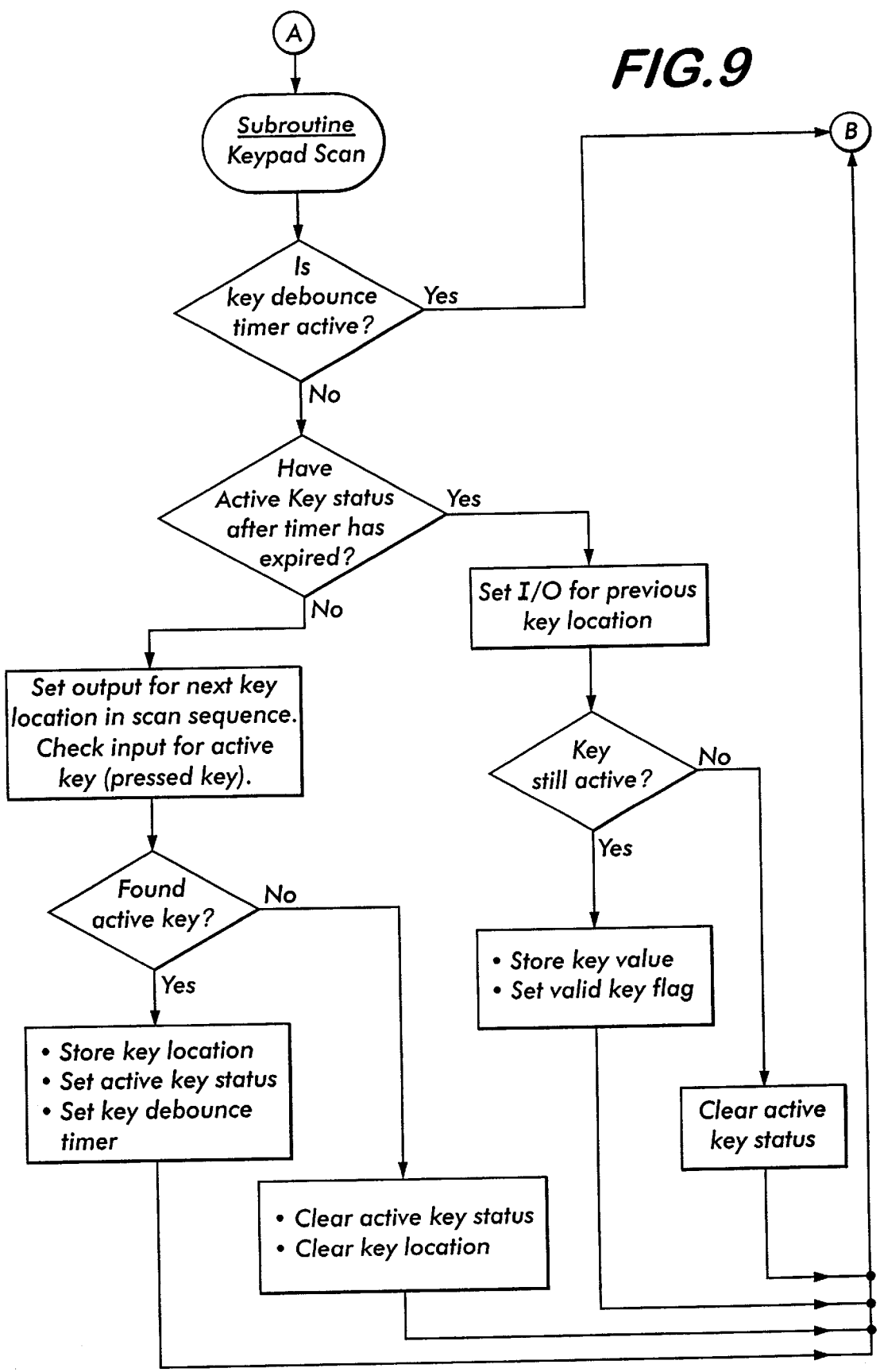
FIG. 9 is a flowchart showing a process for determining whether a key on the key pad used with the present invention has been depressed.

Referring now to FIG. 9, a flowchart is provided illustrating a subroutine wherein the controller 200 monitors the key pad module 45 for a key 212 to become active, i.e., depressed. Under the subroutine, once a scanned key becomes active, i.e., depressed, the subroutine stores the key's value and location within the RAM memory of the controller 200 for use by other subroutines of the software 203 to be discussed in detail below. Also, under the key pad scan subroutine, a debounce timer is utilized for timing the duration of a key press which typically lasts between 150 and 200 milliseconds, to distinguish a genuine key press from noise in the system. Other methods for debouncing key press signals known to those skilled in the art may be employed and are within the scope of the present invention.

The controller 200 is arranged to operate in six different modes. These modes include Shift mode, Program Security Code (PSC) mode, Secured mode, V-Ignition Off mode, Jog mode and Calibrate mode. The first four of these aforementioned modes are utilized by the driver before and during normal operation of the vehicle and will be explained in detail below. The remaining two of these six modes, i.e., the Jog mode and the Calibrate mode, are used only by factory personnel during calibration of the shifting apparatus 10 to the automatic transmission 35. Factory personnel utilize these two modes for programming each of the keys 212 with potentiometer values associated with the various shift positions, so that during normal operation in Shift mode, when a key 212 is depressed by a driver, the shifting apparatus 10 will cause the transmission 35 to shift to the shift position corresponding with the key 212 depressed.

The operation of the controller will now be described in detail. Referring now to function block 280 in FIG. 8 and FIG. 6A, as previously mentioned, the ignition switch 265 may be switched from the "off" position to the "on" position thereby providing ignition voltage from the vehicle battery 211 to the controller 200 via the power line 260. As indicated at function block 284, upon receipt of ignition voltage, the controller 200 initializes itself for operation. Initialization includes the retrieval of the position values assigned to the keys 212 for use in Shift mode, resetting of all controller inputs, outputs and registers, the resetting of all delay timers to zero and the turning off of all display lamps. Also, during initialization, internal RAM memory is initialized.

Figure 8:
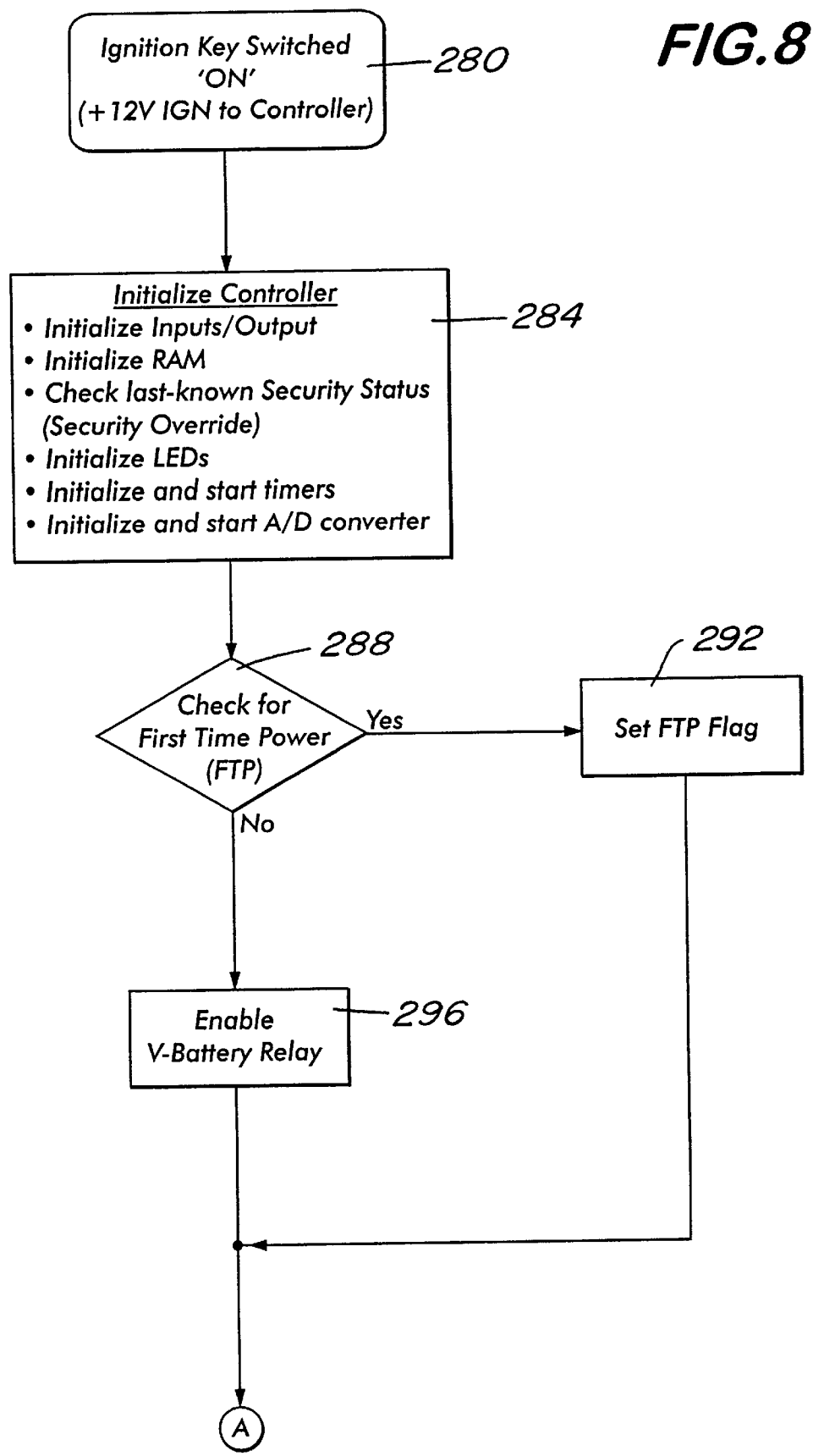
FIG. 8 is a flowchart showing a process for setting an FTP flag in accordance with the present invention.

Next, as shown in FIG. 8, program flow continues down to decision block 288 wherein the microprocessor ascertains if "first time power" is being provided to the controller 200. First time power refers to the first time that power is being provided to the controller 200. The first time power is provided to the controller 200 at the factory during calibration of the shifting apparatus 10. In other words, once the shifting apparatus has been installed in the vehicle and has been calibrated and is ready for use by the driver, first time power has already been provided to the controller 200. At decision box 288, if first time power is being provided, the program circumvents function block 296 and flows to function block 292 and sets a status flag, i.e., the FTP status flag, indicating that first time power is being provided to the controller 200.

Figure 11:
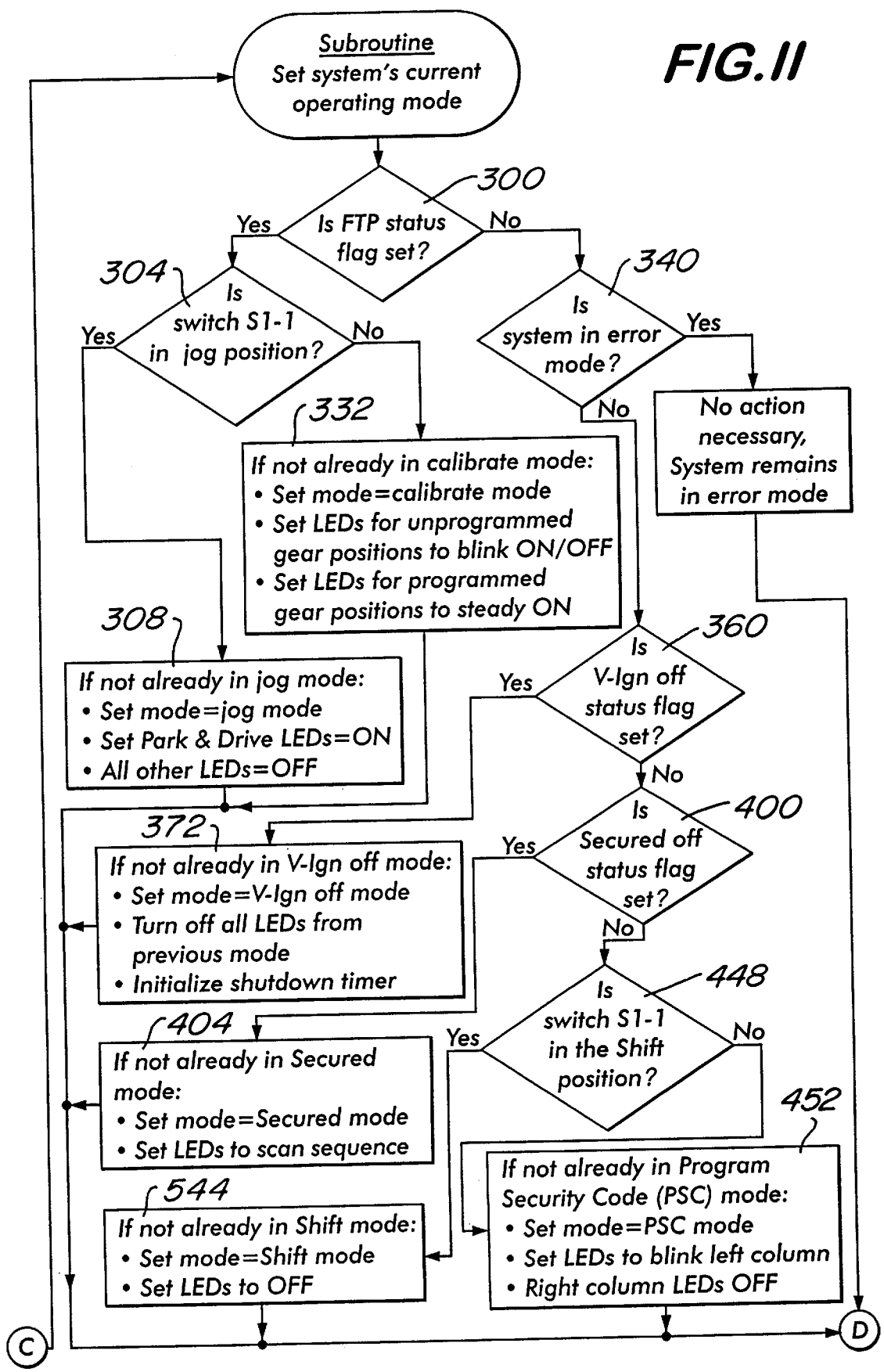
FIG. 11 is a flowchart prioritizing the various operating modes of the shifting apparatus of the present invention and for determining the current operating mode.

Referring now to FIG. 11, a flowchart is shown therein describing a Set System Operating Mode subroutine. Under this subroutine, the software 203 checks the setting of various status flags set throughout the software and also the setting of several switches. The subroutine prioritizes these inputs, determines which mode the shifting apparatus 10 should be operating in and sets other status flags indicating the present operating mode. As shown in the first decision block 300, the software 203 ascertains whether the FTP (first time power) status flag is set. The FTP status flag takes first priority because if the flag is set, this means that the shifting apparatus 10 is at the factory prior to calibration and is not ready for use in a vehicle. If the flag is set, the S1-1 switch 240 (FIG. 6A) located on the side of the controller 200 is arranged to toggle between Jog mode or Calibrate mode. Parenthetically, if the flag is not set, the S1-1 switch 240 is arranged to toggle between Shift mode and PSC mode, to be discussed below. When arranged to toggle between Jog mode and Calibrate mode, factory personnel may program the various keys 212 located on the key pad module 45 so that during normal operation, when the driver depresses a pushbutton, the shifting apparatus 10 will be caused to shift the transmission 35 to the shift position corresponding with the particular keys 212 depressed. As shown in FIG. 11, if the FTP status flag is set, the software 203 flows to decision block 304 and ascertains whether the switch 240 (FIG. 6A) is set at the Jog mode or the Calibrate mode.

If the switch 240 is toggled to the Jog position, the program 203 flows to function block 308 and sets the controller 200 to run in the Jog mode. In the Jog mode, the shifting apparatus 10 enables factory personnel to manually control movement of the actuator module by alternately depressing the keys designated "P" and "D". Manual movement in the Jog mode is necessary for programming of the keys 212 with the various transmission shift positions. As shown in function block 308, once in the Jog mode, the display lamps associated with the "P" and "D" keys on the keypad module 45 flash intermittently while the display lamps associated with the remaining keys 212 are turned off, thus notifying the driver that only the "P" and "D" key values are enabled in the Jog mode. In other words, in the Jog mode, the software 203 will not recognize the depression of any of the remaining keys values, i.e., "R", "N", "2", "1", "S.O.", "AUX.". The program flows to FIG. 12 wherein a table is provided for associating a plurality of subroutines D1 through D7 with key values depressed in each of the six operation modes. As shown at 312 in FIG. 12, since the system is in the Jog mode, upon depressing the "P" or "D" value keys, the program will flow to subroutine D5 (FIG. 18) which controls jogging.

Figure 18:
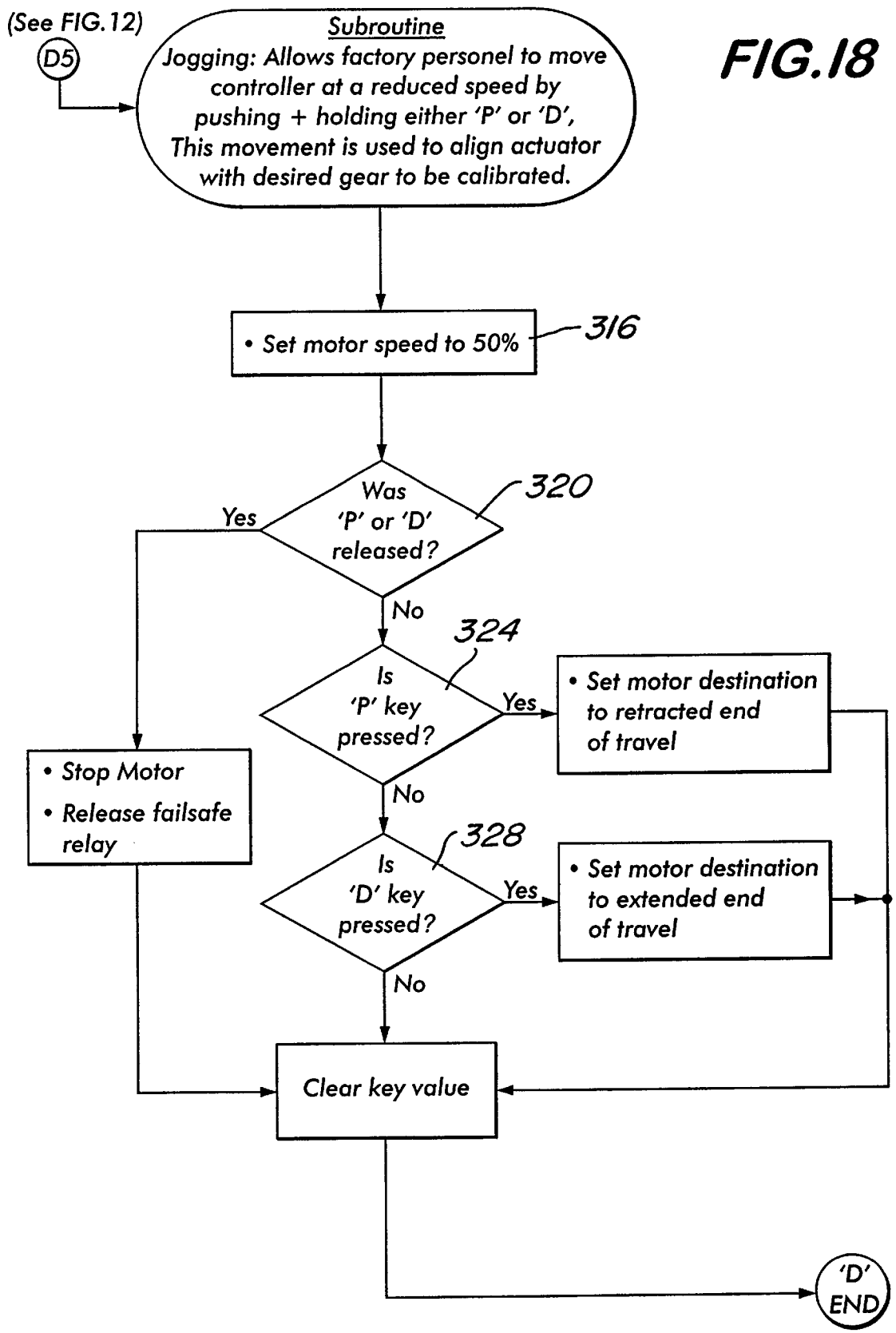
FIG. 18 is flowchart showing a process for operating the shifting apparatus of the present invention in the jog mode.

Referring now to FIG. 18, the Jog subroutine D5 is set forth therein. Specifically, as set forth in function block 316, when in the Jog mode, the DC electric motor 55 disposed within a housing 57 is set to run at fifty percent its normal operating speed. By depressing and holding down the "P" key, factory personnel are able to drive the DC electric motor 55 thus causing clockwise rotation of the shift position select shaft 40 of the transmission 35. This also causes the slidable member 90 to move towards the fully retracted position corresponding to park thus changing the amount of resistance over the variable resistance circuit assembly (see FIG. 2). Likewise, by depressing the "D" key, factory personnel are able to drive the motor 55 in the opposite direction thus causing counterclockwise movement of the shift position select lever 40 thus causing movement of the slidable member 90 towards the fully extended position corresponding to first gear also changing the amount of resistance over the variable resistance circuit assembly.

As shown in decision blocks 320, 324 and 328, the subroutine will continue to drive the DC electric motor 55 until the "P" or "D" key is released by factory personnel. Thus, during installation of the shifting apparatus 10, factory personnel may utilize the "P" and "D" keys on the keypad while in Jog mode to control precise movement of the shift position select lever 40 so as to determine the precise position to which the shift position select lever 40 must be moved to obtain each of the various shift positions of the transmission 35. During Jog mode, factory personnel may remove the transmission housing to observe the internal workings of the transmission and visually assure that the exact shift position has been reached.

Returning to decision box 304 in FIG. 11, after moving the shift position select lever 40 to a precise location associated with a transmission shift position, factory personnel may toggle the S1-1 switch 240 from the Jog position to the Calibrate position thus changing the mode of the controller 200 from Jog mode to Calibrate mode. In the Calibrate mode, the keys 212 may be programmed with each of the transmission shift positions. Movement of the S1-1 switch 240 in this manner causes the software to flow from decision block 304 to function block 332 and set the mode to Calibrate mode. As shown in function block 332, once in Calibrate mode, the software sets display lamps associated with unprogrammed keys 212 to flash intermittently and sets display lamps associated with keys already programmed with transmission shift positions to illuminate continuously. Referring now to the Calibrate mode portion 336 of FIG. 12, the active values in the Calibrate mode are "P", "R", "N", "D", "2" or "1". Upon depression of any of these keys, the software 203 flows to the Calibrate subroutine D7 set forth at FIG. 21. The remaining keys, i.e., "S.O." and "AUX", are disabled in the Calibrate mode.

Figure 21:
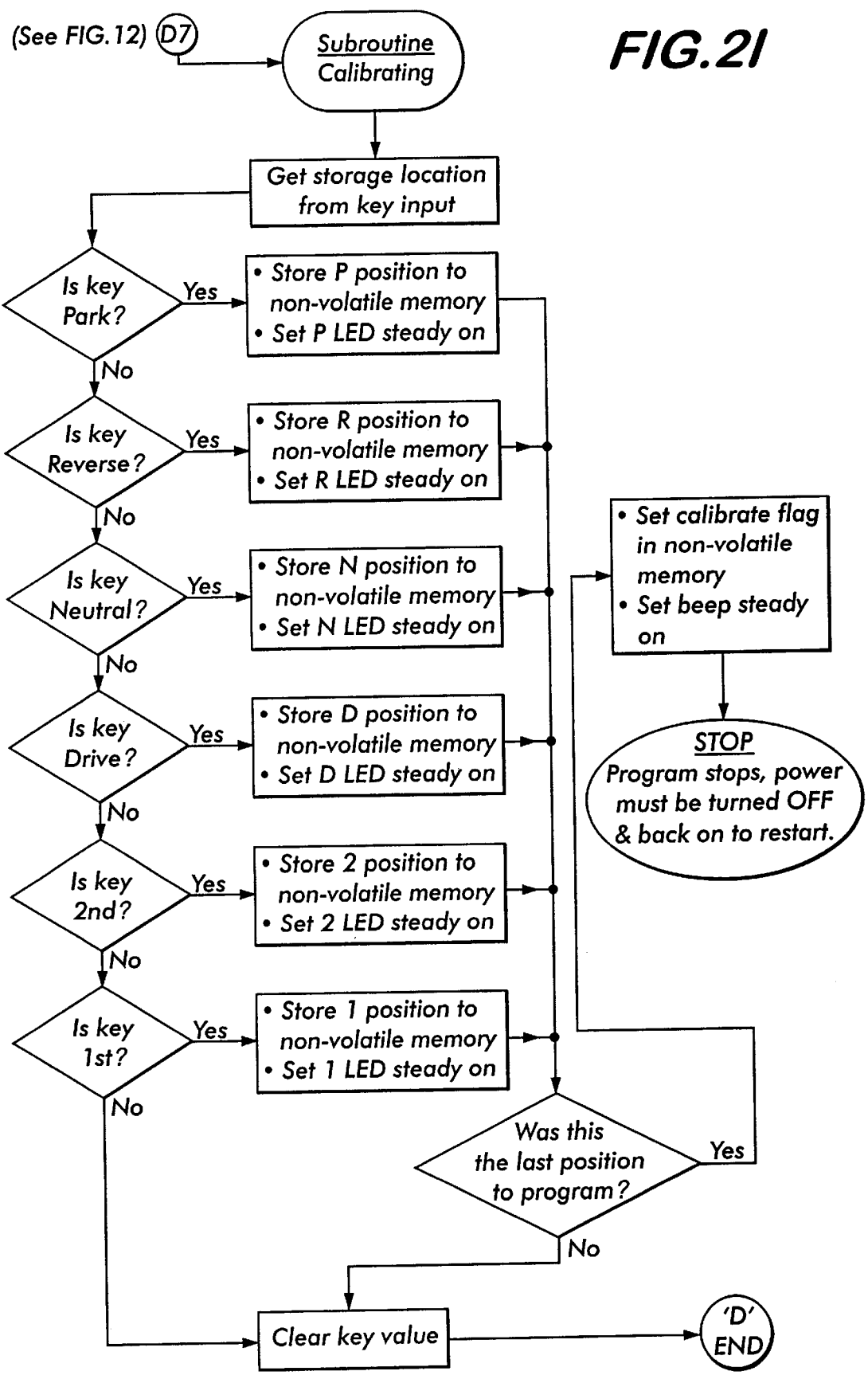
FIG. 21 is a flowchart showing a process for calibrating the shifting apparatus of the present invention.

Referring now to FIG. 21, under the Calibrate subroutine (D7), once an active flashing key is depressed by factory personnel, the D7 subroutine reads the potentiometer value associated with the present position of the slidable member 90 and assigns that value to the depressed key 212. For example, by depressing the flashing park key "P" while in Calibrate mode, the Calibrate subroutine reads the potentiometer value based upon the current position of the slidable member 90, e.g., the fully retracted position, and stores that position value associated with the park key in temporary memory. The subroutine sets the park key "P" to illuminate continuously indicating to factory personnel that the "P" key has been programmed with the potentiometer value associated with the fully retracted position. Thereafter, factory personnel may toggle the S1-1 switch back to the Jog mode and by utilizing the "P" and "D" keys, jog the shift position select lever 40 to the next transmission shift position, e.g., the reverse position. Once the position has been precisely reached, factory personnel may repeat the process by toggling the S1-1 switch 240 from the Jog position to the Calibrate position and depressing the flashing "R" key. Upon depressing the flashing "R" key in Calibrate mode, the D7 subroutine reads the potentiometer value associated with the new position of the slidable member 90 and assigns that value to the depressed key 212. The remaining active keys, i.e., "N", "D", "2" or "1", are programmed in a similar manner. Once all of the transmission shift positions have been programmed, they are stored in nonvolatile memory, e.g., an EEPROM. As previously mentioned, position values are stored in temporary memory rather than nonvolatile memory until all keys have been programmed. In this manner, in the event a key is programmed with an incorrect value, by turning off ignition voltage to the controller, all temporarily stored positions are erased thus enabling a fresh start at calibration. At the end of the calibration cycle, all keys 212 are steadily illuminated indicating that they have been programmed. The keypad 45 emits a steady beep indicating to factory personnel that calibration has been successfully completed. Under Subroutine D7, to exit the Calibration mode, power to the controller 200 must be turned off and turned back on. Since all position values have been stored in non-volatile memory, they will not be lost upon loss of power. Once Calibration mode has been completed, the software 203 simply loops back to FIG. 8, function block 280.

As shown in FIG. 8, after the shifting apparatus 10 has been calibrated, upon switching the ignition switch 265 from the "off" position to the "on" position, during the initialization step (function block 284), the controller 200 retrieves the assigned position values from the nonvolatile memory. Since first time power was provided during jogging and calibration, the program flows from decision block 288 to function block 296 wherein a relay 283 (FIG. 6A) is closed to provide a back-up connection between the controller 200 and the vehicle battery 211 through cable 255. This back-up connection is in addition to the controller's 200 connection to the vehicle battery 211 through the ignition switch 265. In this manner, in the event the ignition switch 265 is switched from the "on" position to the "off" position during operation of the vehicle, power to the controller 200 will be maintained through the back-up connection over cable 255. Although the relay 283 is depicted in FIG. 6A as being external to the controller 200, the relay 283 could also be provided inside the controller 200.

Figure 27:
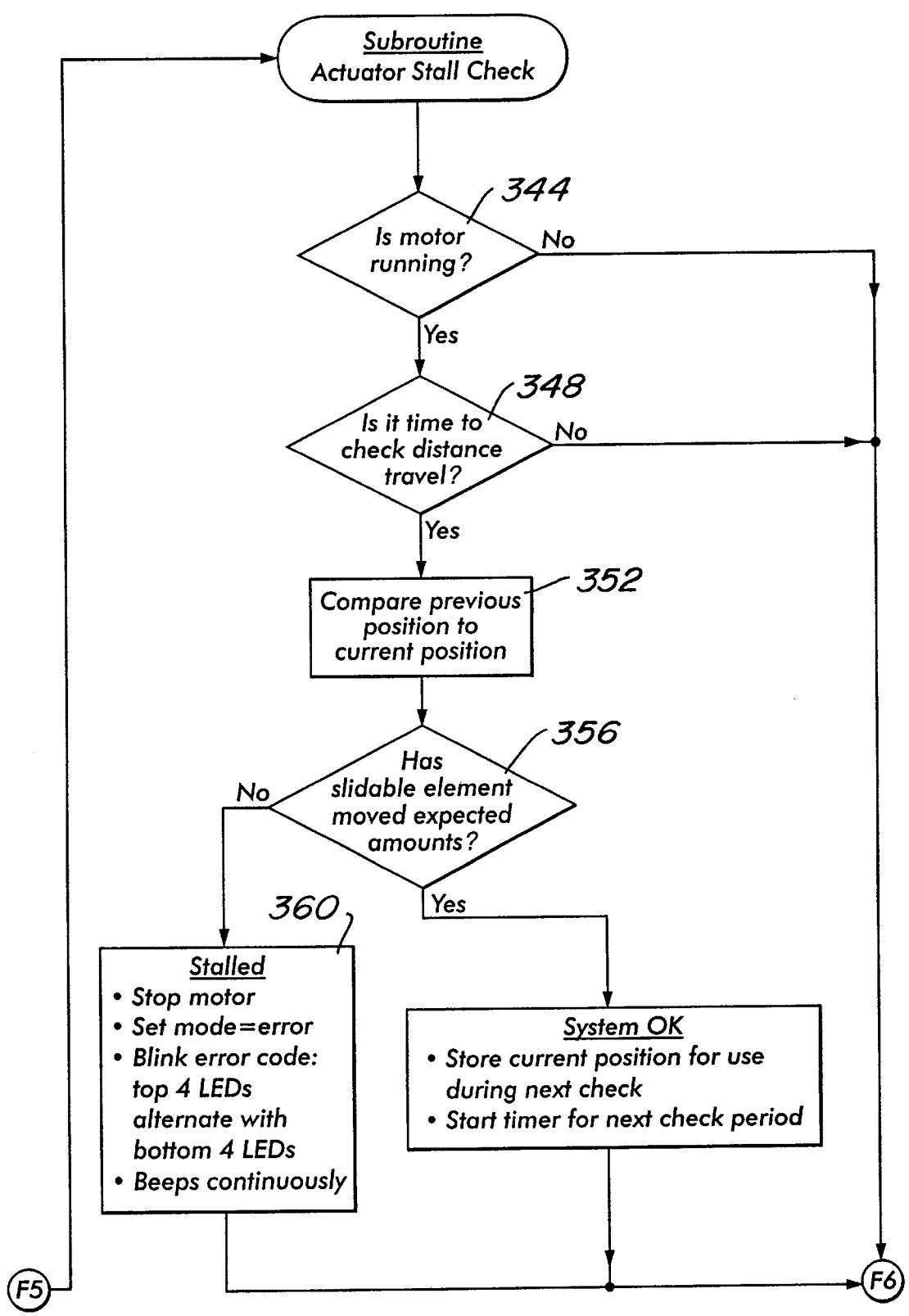
FIG. 27 is a flowchart setting forth an actuator stall check subroutine.

Returning again to the current operating mode flowchart in FIG. 11, since the FTP status flag is not set in decision block 300, the software 203 flows down its priority list of other operation modes. Specifically, the software 203 flows to decision block 340 wherein it ascertains whether the shifting apparatus 10 is in error mode, the next highest priority. For example, the controller 200 could place the system into error mode in the event of a malfunction within the actuator module 50 that would impede travel of the slidable element 90. The software 203 includes an actuator stall check subroutine which determines whether to place the shifting apparatus 10 into error mode. The actuator stall check subroutine is set forth in FIG. 27. Referring within this subroutine to function block 344, the software 203 first determines if the DC electric motor 55 is running. If yes, under decision and function blocks 348, 352 and 356, the controller 200 reads the potentiometer housed within the controller 200 over predetermined time intervals and determines how far the slidable member 90 has traveled. If the slidable element 90 has not traveled the amount of distance expected by the software within the time interval, under function block 360, the controller 200 stops operation of the DC electric motor 55, sets the mode to error mode and sets the display lamps to flash a warning to the driver. For example, the display lamps associated with the top four keys 212 on the key pad 45 may be set to flashing alternately with the display lamps associated with the bottom four keys 212. Additionally, the software 203 sets the audible alarm (not shown) to emit a beep pattern, e.g., a continuous tone. These signals notify the driver that an error has occurred somewhere within the actuator module 50. The shifting apparatus 10 remains in error mode until a repair has been completed.

As set forth in function block 356, if the slidable element 90 has traveled the expected amount, the subroutine stores the current position of the slidable element 90 and uses it during the next check when the subroutine loops back.

Figure 10:
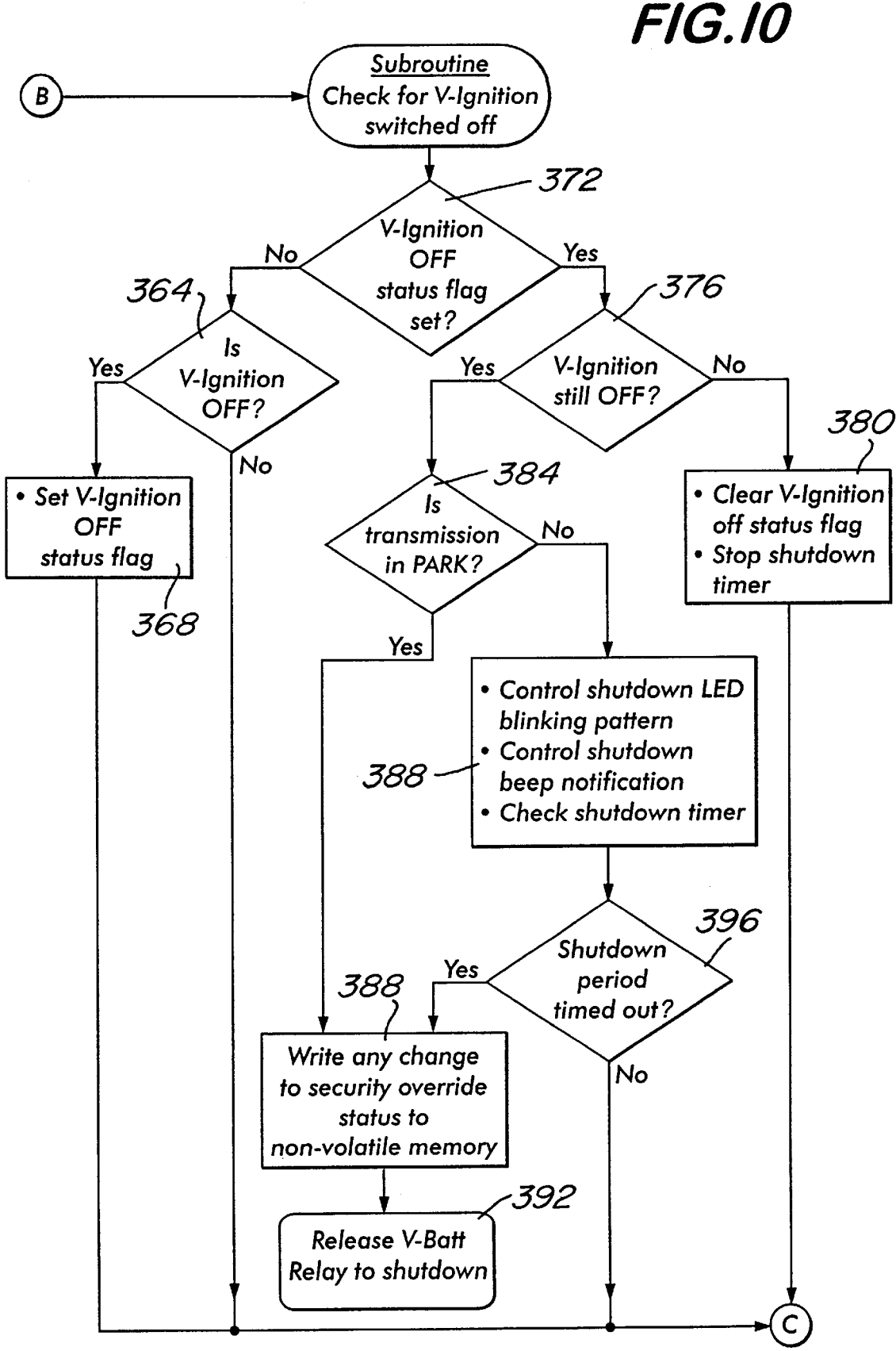
FIG. 10 is a flowchart showing a process for determining whether the motor vehicle's ignition has been switched off and for performing certain operations in the event the ignition has been switched off.

Returning to FIG. 11, if the system is not in error mode, the software 203 flows from decision block 340 to the next decision block 360 on the priority list to ascertain whether a flag has been set indicating that the ignition switch 265 has been turned from the "on" position to the "off" position during operation of the vehicle. The V-Ign Off status flag is set in a subroutine set forth in FIG. 10. The subroutine first ascertains whether the V-Ign Off status flag has been set. If no, the subroutine flows to decision block 364 to ascertain whether the ignition switch 265 has been turned from the "on" position to the "off" position. If the ignition switch 265 has been turned off, under function block 368, the V-Ign off status flag is set. Returning to FIG. 11, under the decision block 360, once the subroutine ascertains that the V-Ign off flag has been set, the software flows to function block 372 and sets the system to V-Ign off mode. As set forth in function block 372, the software 203 turns off all key pad display lamps and initializes a shut down timer. Returning to FIG. 10, the subroutine loops back to decision box 372 to ascertain whether the V-Ign off status flag has been set. If yes, the subroutine flows to decision block 376 to ascertain whether the ignition switch 265 is still off. If the driver turns the ignition switch from the "off" position to the "on" position, the subroutine flows to function block 380 wherein the V-Ign off status flag is cleared and the shut down timer is stopped. If the ignition switch 265 is still off, the subroutine flows to decision block 384 to ascertain whether the transmission is in the park position. If yes, the subroutine flows to function blocks 388 and 392 wherein the software 203 writes any change made to the status of the Security Override key (to be explained in detail below) to nonvolatile memory and thereafter, shuts itself down by opening the battery relay 283 which disconnects all vehicle battery power to the controller 200. By disconnecting itself from the battery, the controller no longer draws current from the battery. By writing security override status changes to nonvolatile memory prior to shut down, when the vehicle is restarted, these changes may be retrieved from memory by the software 203 during the initialization step (discussed above).

If the transmission is in a shift position other than park, such as drive, the subroutine flows to from decision block 384 to function block 388 wherein the software 203 sets a shut down timer for a predetermined time interval, e.g., one minute, during which time certain display lamps associated with keys 212 in the key pad 45 are set to flash in an alternating pattern. The flashing display lamps 212 serve to alert the driver that an ignition off condition has been detected during vehicle operation in a transmission shift position other than park. For example, if the ignition switch 265 is turned off while the vehicle is in the drive position, the "P" and "D" keys in the keypad 45 are set to blink in an alternating manner indicating to the driver that the vehicle is presently in the drive shift position and should be shifted to the park shift position. Additionally, a beep notification is sent from the audible alarm located within the key pad 45 alerting the driver of this condition, i.e., that the driver has shut off the ignition switch 265 while the vehicle is in gear. If during that time interval the driver depresses the "P" key, the controller 200 moves the actuator to park and shuts itself off providing certain safety conditions are met discussed below.

Under certain circumstances, such as where the vehicle is traveling at considerable rate of speed, alerting the driver that the ignition has been shut off could prevent a serious accident. Under other circumstances, it may be necessary for the driver to place the vehicle in neutral with the ignition switch 265 off such as for towing purposes. Under these circumstances, shutting down the controller 200 prevents draining of the battery. Upon determining that a predetermined time interval, e.g., one minute, has been reached (decision block 396), if the ignition switch 265 is still off, the software 203 flows to function blocks 388 and 392 wherein the software 203 writes changes made in the security override status (explained below) to non-volatile memory and shuts itself down as described above.

Returning again to FIG. 11, if the V-Ign off status flag is not set, the software 203 checks the next status flag on the priority list. In particular, the software 203 flows to the decision block 400 and ascertains whether a secured status flag has been set. If a secured status flag is set, the software 203 is "locked" in Security mode and prevents starting of the engine in the event the ignition switch 265 is switched from the "on" position to the "crank" position. In other words, when in Security mode, unless a matching user code is entered, any attempt at starting the vehicle will be prevented. Once the driver enters a user code that matches an identification code previously stored in memory, the shifting apparatus is unlocked from Security mode.

Each time the ignition switch 265 is turned to the "on" position upon vehicle start-up, voltage is provided from the battery to the controller 200. The software 203 comes up in Security mode and awaits entry of a valid user code to allow the driver to engage the starter motor. As shown in FIG. 11, upon determining that a secured status flag has been set, the software 203 flows to function block 404, sets the shifting apparatus 10 to Security mode and sets the display lamps associated with the keys 212 to flashing. This provides notification to the driver that the software 203 is monitoring the key pad 45 for the entry of a valid user code.

In Security mode, the software 203 is arranged to receive a valid user code that corresponds with either a factory identification code or a PSC personal identification code. A factory identification code is stored in the CPU's permanent memory by factory personnel during installation of the shifting apparatus. The factory identification code may be provided to the purchaser on a laminated card packaged with the shifting apparatus. A PSC personal identification code is programmed by the driver who has already entered a valid factory identification code. It is to be understood that while one preferred device for providing the user code signal is the key pad 45, the present invention contemplates that other known devices and/or subsystems may be used to enter the user code information. For example, the key pad 45 may be replaced with a proximity or other card reader operable to read information provided on a magnetic strip of an access card, a memory disk reading device, voice recognition system or other known information transfer device/system.

Figure 12:
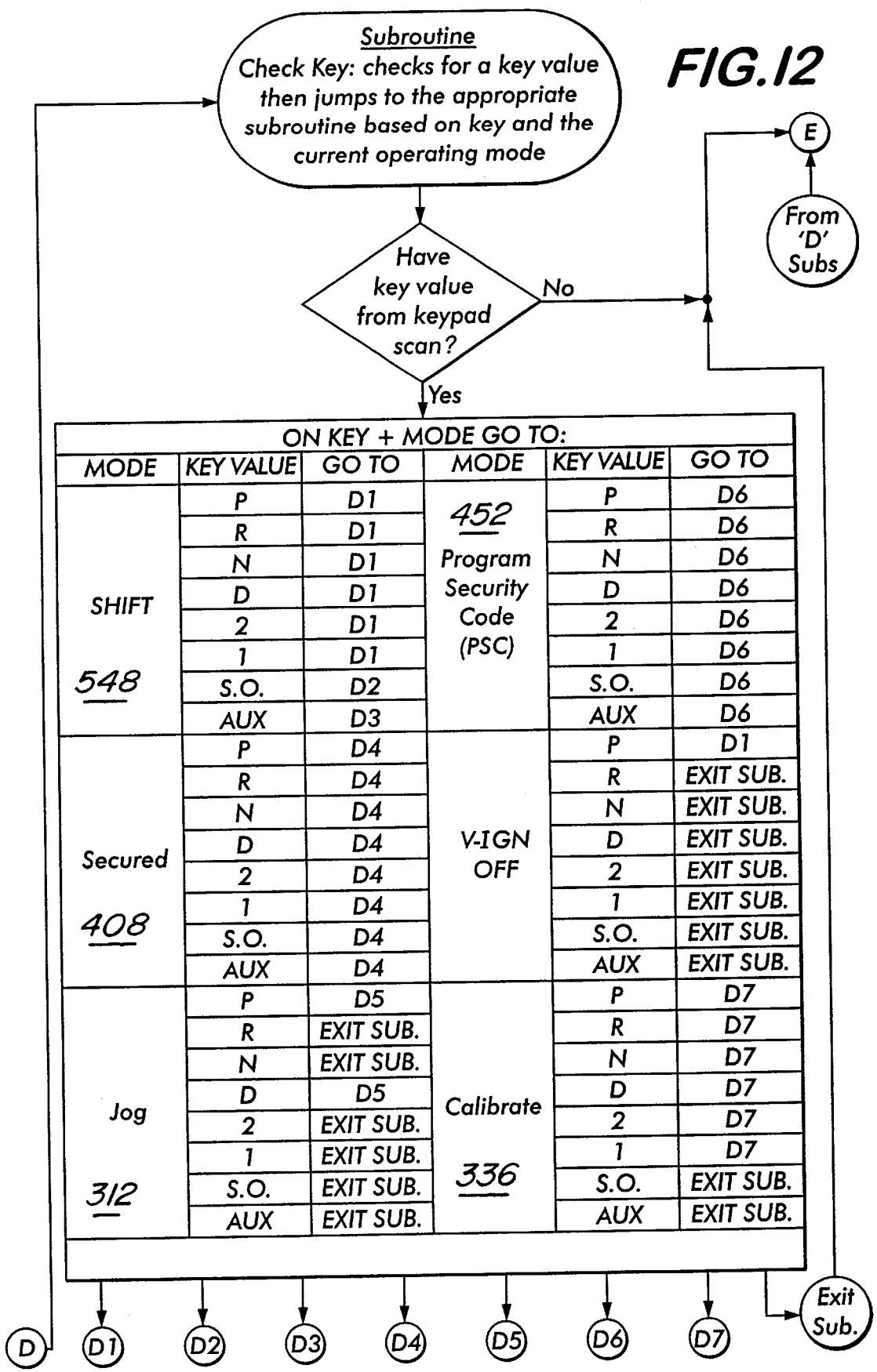
FIG. 12 is a table illustrating the process for determining the execution of various subroutines based upon the mode of operation of the shifting apparatus of the present invention and a key press.
Figure 16:
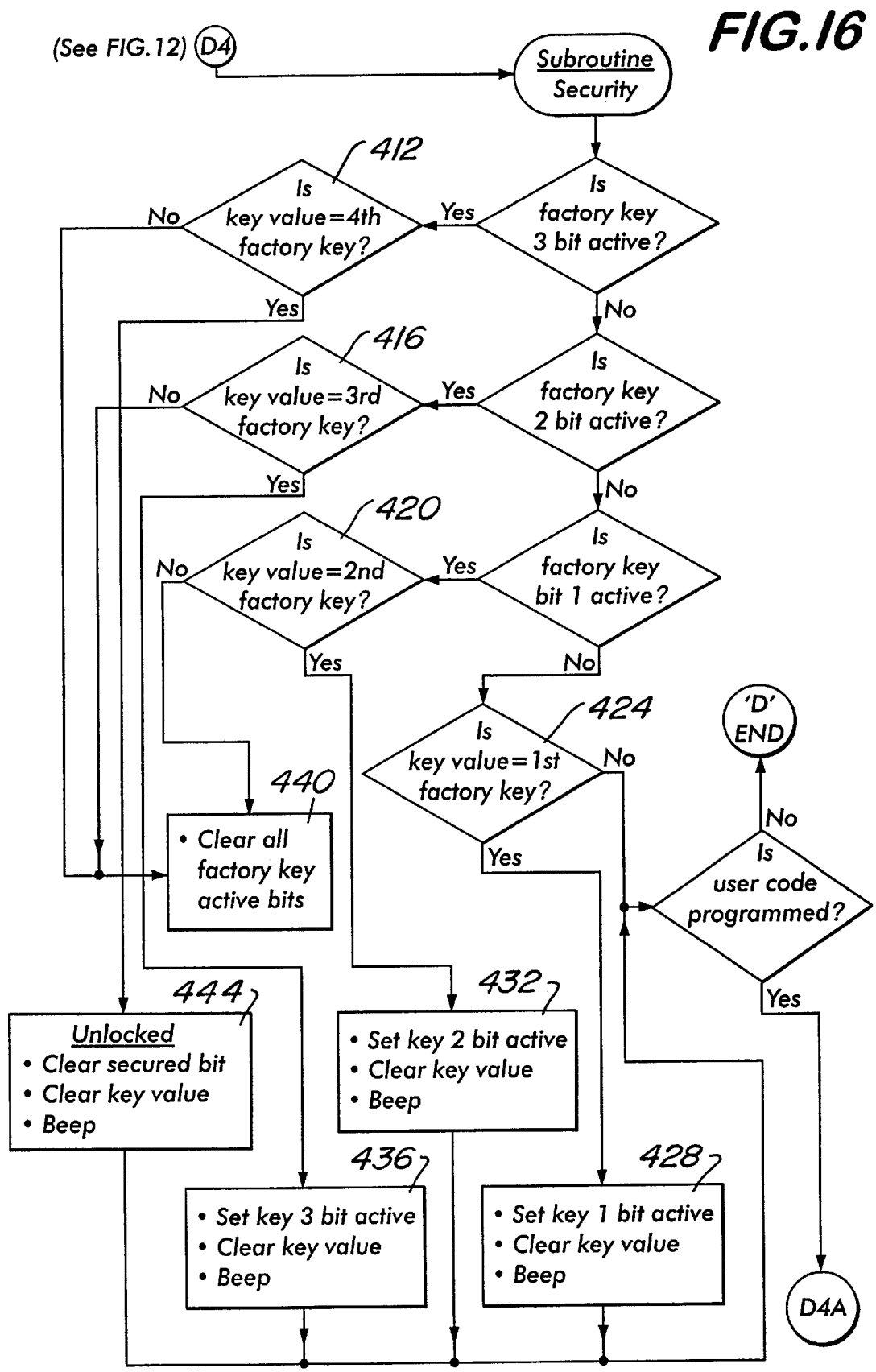
FIG. 16 is a flowchart showing a process for determining whether a user inputted code is identical to a factory inputted identification code.

Referring now to the Secured mode portion 408 of FIG. 12, the active key values in the Secured mode include all key values on the key pad, i.e., "P", "R", "N", "D", "2" or "1", "S.O." and "AUX". Thus, all these key values are valid for input of a user code. Thus, upon the depression of any of these active keys, the software 203 flows to the Security subroutine D4 set forth at FIG. 16. The Security subroutine monitors the key pad 45 for entrance of a user code corresponding with a factory identification code of any number of digits, e.g., four digits. Once a valid user code is entered, the shifting apparatus 10 becomes "unlocked" to enable starting of the vehicle engine and operation in Shift mode provided the vehicle is in either park or neutral (discussed below). Under the Security subroutine, as set forth in the decision blocks 412, 416, 420 and 424 as key values are entered, they are compared with stored factory key values comprising the factory identification code. As shown in decision blocks 428, 432 and 436, if the subroutine receives a correct key value, it sets a key bit to active status, clears the inputted key and activates the audible alarm to provide a beep tone notifying the driver that a key value was entered. If an incorrect key value is inputted, the subroutine flows to function block 440 which clears the incorrect key value and all correct key values previously inputted and beeps. The subroutine loops back onto itself until the correct sequence of key values comprising the factory identification code has been entered. As shown in function block 444, once a user code has been entered corresponding to the correct factory identification code, the security flag is cleared and the audible alarm is activated to provide a beep tone notifying the driver that the correct code was entered. Referring again to FIG. 11, each time the vehicle is restarted, the system will return to the Secured mode until the security flag is cleared.

Figure 26:
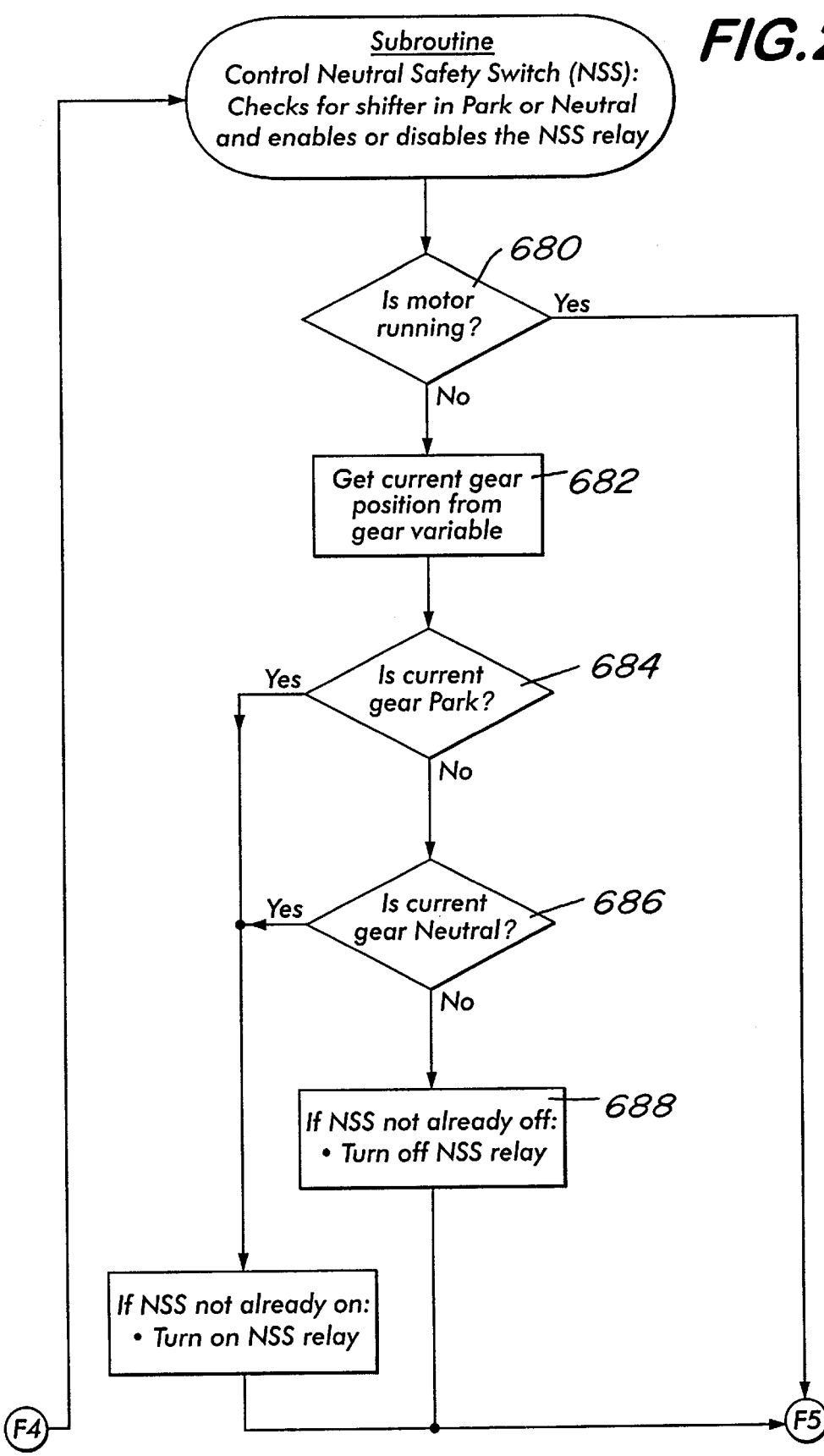

Next, the software 203 flows to FIG. 26 wherein a subroutine provides a safety feature preventing the engine from starting if the transmission shift position is other than park or neutral. Under FIG. 26, the subroutine closes a neutral safety switch (not shown, but located inside the controller 200) enabling engine starting only in the event the vehicle is in either the park or neutral transmission shift positions. Specifically, under decision block 680, the subroutine ascertains whether the motor is running. If yes, as set forth in function block 682, the subroutine next determines the current gear position by retrieving the current gear variable set in the subroutine for determining the current gear position (discussed below). Under decision blocks 684 and 686, the subroutine ascertains whether the current gear position is park or neutral. If yes, the neutral safety switch is closed allowing voltage to flow over line 690 thus enabling starting of the engine when the ignition switch 265 is turned to the "crank" position. If no, the subroutine will prevent starting of the vehicle engine, however, will enable the driver to shift the transmission to either park or neutral. The subroutine set forth in FIG. 26 replaces existing neutral safety switches that are provided as a standard feature on most vehicle transmissions.

Returning now to FIG. 11, decision block 400, once the security flag is cleared, the software 203 flows to the next priority in the list, the decision block 448 wherein the software 203 ascertains whether the S1-1 switch is toggled to the Shift mode. As mentioned previously, because the FTP status flag is not set, the S1-1 switch 240 is arranged to toggle between Shift mode and PSC mode. If the S1-1 switch is not toggled to the Shift mode, the software 203 flows to function block 452 wherein it sets the shifting apparatus 10 to the Program Security Code mode and sets the display lamps to flash in a predetermined pattern. For example, the display lamps associated with the left column of keys 212 on the key pad 45 flash intermittently and the display lamps associated with the right column of keys 212 on the key pad 45 are turned off In the Program Security Code (PSC) mode, the vehicle driver is permitted to program the shifting apparatus 10 to recognize a second identification code in addition to the factory identification code. The shifting apparatus 10 must be in the park transmission shift position to enter the PSC mode. The second identification code, or PSC personal identification code, is a secondary identification code in addition to the factory identification code that is chosen by the vehicle driver. Thus, once the apparatus 10 is programmed to recognize the driver chosen PSC personal identification, upon entry of a user code corresponding to either the factory identification code or the PSC personal identification code, the software 203 will clear the security flag thus enabling setting to the Shift mode to enable vehicle operation.

Figure 19:
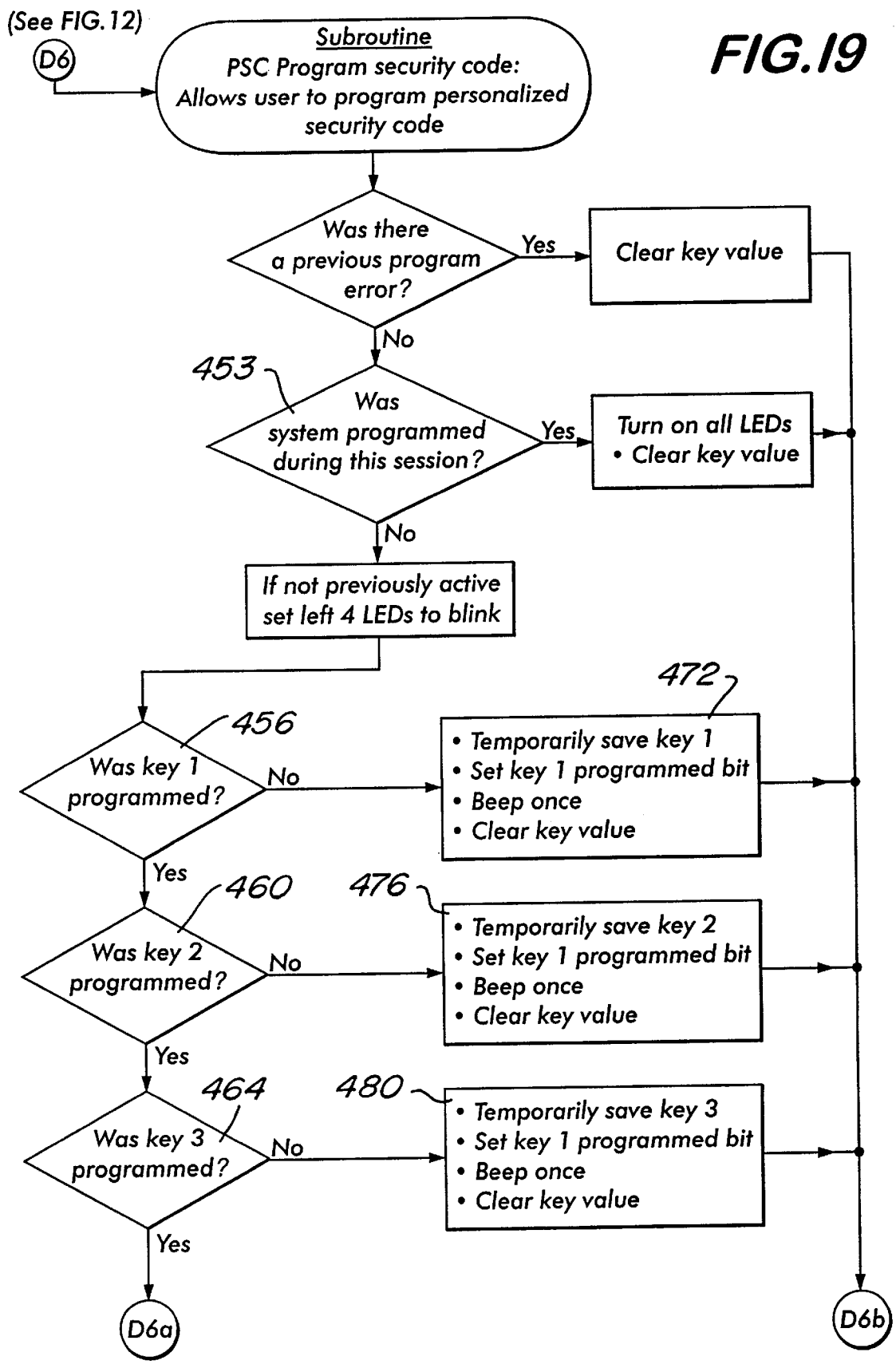
FIG. 19 is a flowchart showing a process for storing in memory an identification code designated by the motor vehicle driver.
Figure 20:
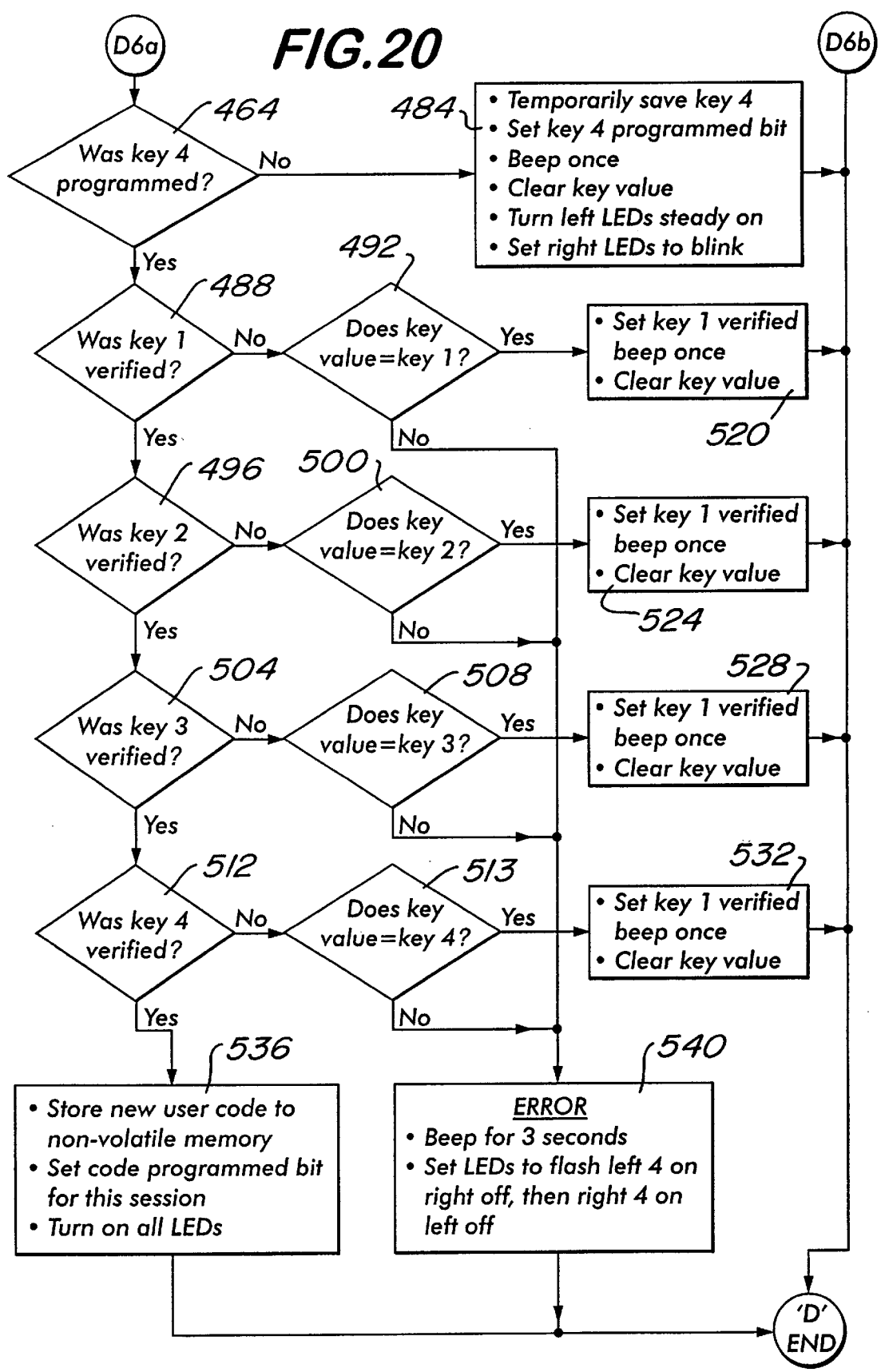
FIG. 20 is a flowchart showing a process for verifying a driver designated identification code.

Referring now to the Program Security Code (PSC) portion 452 of FIG. 12, the active key values in this mode include all key values on the key pad, i.e., "P", "R", "N", "D", "2" or "1", "S.O." and "AUX". Thus, any of these keys may be chosen by the driver for the sequence comprising the PSC personal identification code. Upon depression of any of these keys while in PSC mode, the software 203 flows to the Program Security Code (PSC) subroutine D6 set forth at FIGS. 19 and 20. Although FIGS. 19 and 20 show the PSC personal identification code being comprised of four key values, in accordance with the present invention, any number of key values may be utilized in forming the PSC personal identification code. As shown in the flowchart, unless a previous PSC personal identification code has been successfully entered (decision block 453), the PSC subroutine sets the display lamps on the key pad 45 to flash in a predetermined pattern, e.g., left column display lamps flashing intermittently, right column display lamps turned off, to indicate to the driver that the subroutine is monitoring the key pad 45 for entrance of a sequence of key values comprising a new PSC personal identification code. As set forth in the decision blocks 456, 460, 464 and 468, and in the function blocks 472, 476, 480 and 484, as each key value in the sequence is entered, the subroutine saves the key value at a temporary location by setting a bit, clears the key value and activates the audible alarm to beep notifying the vehicle driver that the key value entered has been accepted by the subroutine. As set forth in function block 484, once the last key value comprising the PSC personal identification code has been entered and accepted, the subroutine sets the display lamps associated with the left column keys 212 on the pad 45 to illuminate continuously and the display lamps associated with the right column keys to flash intermittently. This provides notification to the vehicle driver that the PSC personal identification code has been accepted and that the subroutine is now ready to perform a verification of the entered PSC personal identification.

For verification, the driver simply reenters the PSC personal identification code. As set forth in the decision blocks 488, 492, 496, 500, 504, 508, 512 and 516, as each key of the PSC personal identification code is reentered, the subroutine determines which key in the sequence is being entered and then compares the value of that key with the key values of the previously entered PSC personal identification code. As shown in function blocks 520, 524, 528 and 532, as each key is verified, the subroutine activates the audible alarm to beep notifying the vehicle driver that a key value has been verified, clears the key value and monitors the key pad 45 for entrance of the next key. If an incorrect verification key is entered, display lamps on the key pad flash in a predetermined pattern, e.g., alternating between the left column and the right column. To reenter the PSC mode, the controller must be switched out of PSC mode and back into PSC mode utilizing the S1-1 switch. As set forth in function block 536, once all keys in the PSC personal identification code have been verified, the new PSC personal identification code is stored in non-volatile memory, e.g., an EEPROM, and the software 203 turns off all display lamps. With the PSC personal identification code now programmed, the vehicle driver may clear the security flag by entering a user code corresponding to either the factory identification code or the driver programmed PSC personal identification code in order to start the vehicle and operate in the Shift mode. As set forth in function block 540, if during the verification an invalid key value is entered, the subroutine activates the audible alarm to emit a beep tone for a predetermined time interval, e.g., three seconds, and sets the display lamps to flash in a predetermined pattern notifying the vehicle driver that an invalid key was entered during the verification step. The subroutine remains in this error mode until switch S1-1 is toggled out of PSC to Shift mode and then toggled back into PSC to perform programming again.

Figure 17:
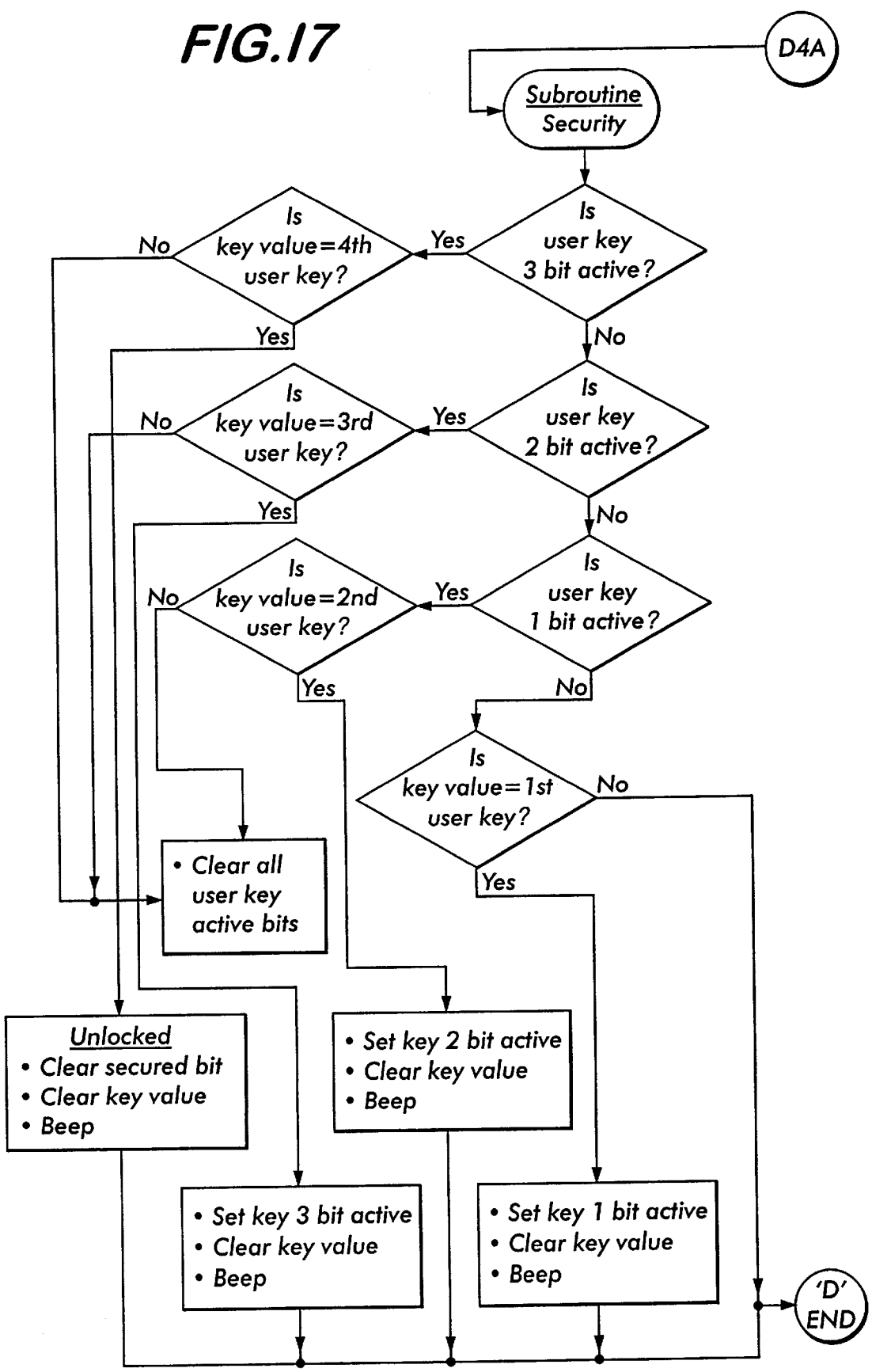
FIG. 17 is a flowchart showing a process for determining whether a user inputted code is identical to an identification code previously inputted by the motor vehicle driver.

Referring now to FIG. 17, subroutine D4A, the security flag may also be cleared by entering a user code corresponding to the PSC personal identification code programmed by the driver as described above. In particular, under Security subroutine D4A, the subroutine monitors the key pad 45 for entrance of a user code corresponding to the PSC personal identification code, e.g., four digits. Once a user code matching the PSC personal identification code is entered, the shifting apparatus 10 becomes "unlocked" enabling the driver to start the vehicle (provided it is in neutral or park) and set the shifting apparatus 10 into the normal shifting mode for vehicle operation. The subroutine D4A operates in substantially the same manner as the Security subroutine D4 set forth in FIG. 16 except instead of comparing entered key values with a factory identification code, the subroutine compares driver entered key values with the PSC personal identification code previously programmed by the driver. The subroutine loops back onto itself until the correct sequence of key values comprising the PSC personal identification code has been entered. Once the correct PSC personal identification code has been entered, the security flag is cleared enabling operation in the Shift mode.

Figure 13:
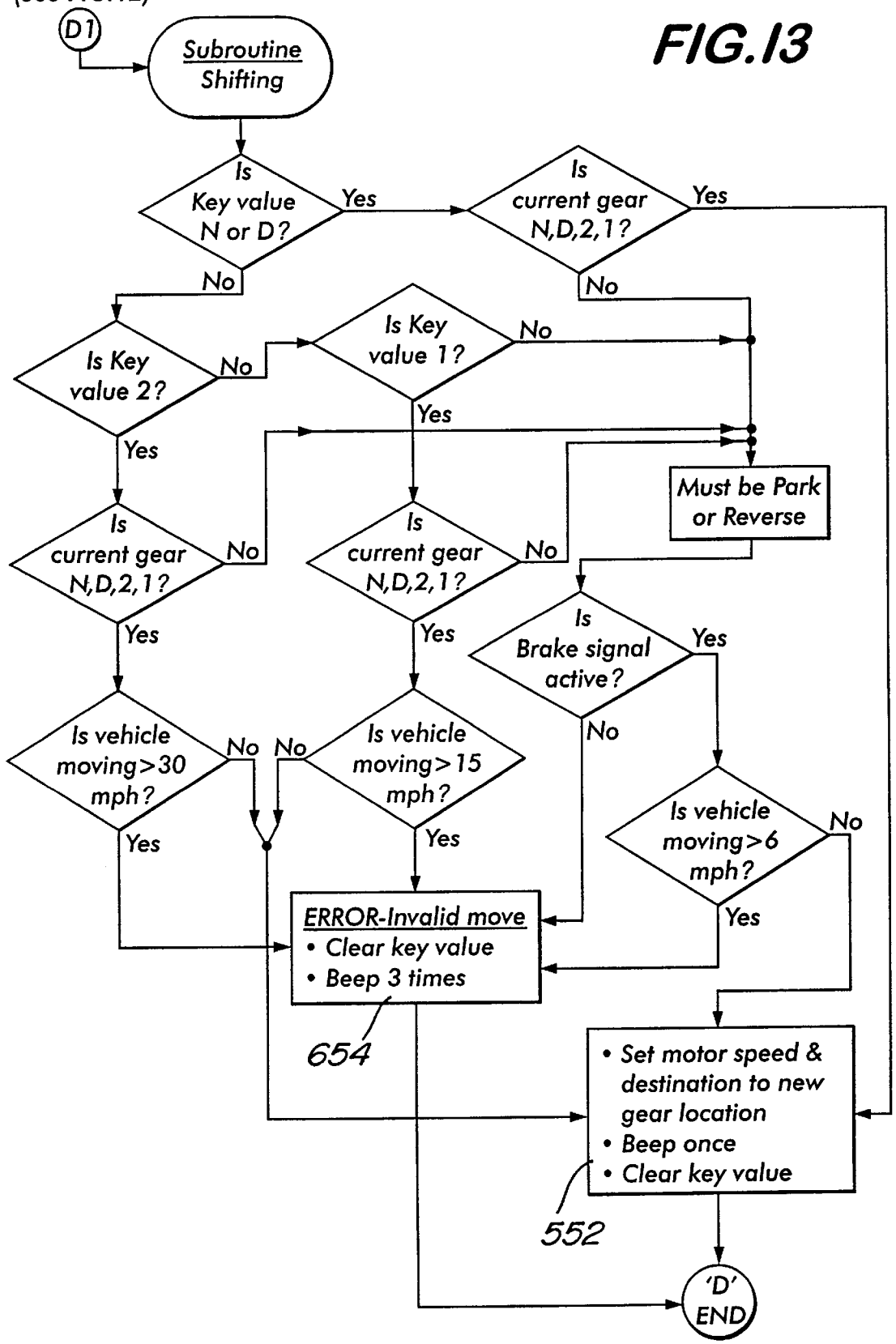
FIG. 13 is a flowchart showing a process under which the shifting apparatus of the present invention shifts the's automatic transmission.

Returning now to FIG. 11, decision block 448, if the S1-1 switch is toggled toward the Shift mode, the software 203 flows down to function block 544 wherein it sets the shifting apparatus 10 to Shift mode and turns off the display lamps associated with the keys 212. Referring now to the Shift mode portion 548 of FIG. 12, the active key values in the Shift mode include all key values on the key pad, i.e., "P", "R", "N", "D", "2" or "1", "S.O." and "AUX". Upon depression of any of the keys corresponding to a transmission shift position, i.e., "P", "N", "D", "2" or "1", the software 203 flows to the Shift subroutine set forth at FIG. 13 wherein the subroutine monitors the key pad 45 for entrance of a key corresponding to a transmission shift position. As set forth in function block 552, once a key is depressed corresponding to a desired transmission shift position, the software 203 retrieves from nonvolatile memory a potentiometer value associated with the depressed key and stores the value in a motor destination register. The software also sets a speed for the electric motor 55.

Figure 22:
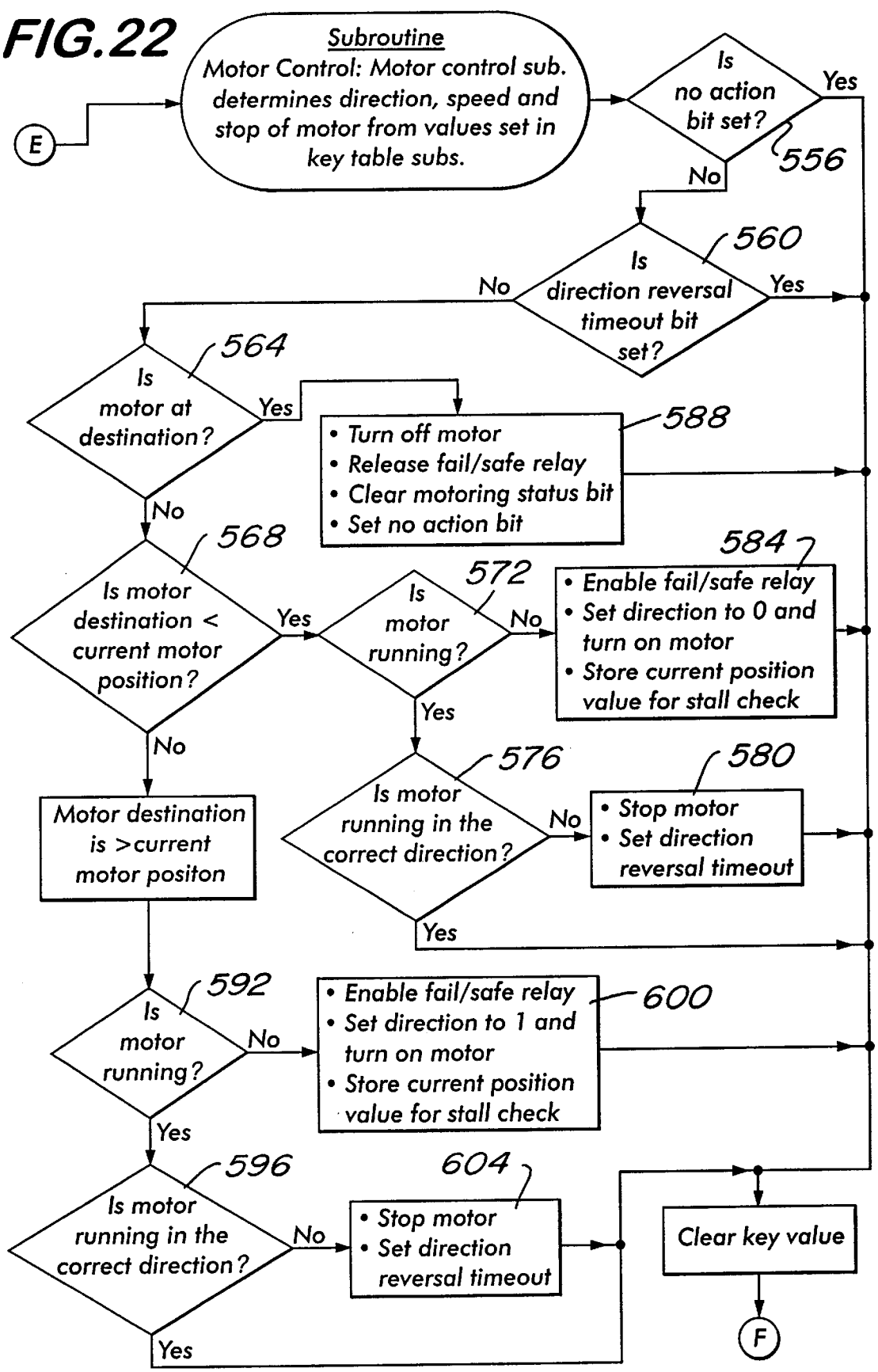
FIG. 22 is a flowchart showing a process for controlling operation of the shifting apparatus of the present invention.

Referring now to FIG. 22, a Motor Control subroutine is set forth therein. Among other things, the Motor Control subroutine compares the potentiometer value stored in the motor destination register (representing the desired transmission shift position) with the potentiometer value associated with the present position of the slidable member 90 to ascertain whether the shift position select lever 40 has been moved to the desired transmission shift position. The subroutine flows to a decision block 556 where it determines whether a no action bit is set. So long as this status bit is set, the subroutine will not energize the electric motor 55. If this status bit is not set, the subroutine flows to decision block 560 wherein the subroutine ascertains whether the electric motor 55 is in the middle of a direction reversal timeout. The direction reversal timeout bit is a commonly employed time delay device which provides a time interval, e.g., 200 milliseconds, during which the electric motor 55 ceases operation allowing for collapsing of the induction field associated with the electric motor 55 prior to reversal of motor direction. If the direction reversal timeout bit is not set, the subroutine flows to decision block 564 and ascertains whether the electric motor 55 has caused the slidable element 90 to travel to its destination, i.e., to a location having a potentiometer value equal to or within a tolerance range of the potentiometer value stored in the motor destination register.

If no, the subroutine flows to decision block 568 wherein it ascertains whether the potentiometer value associated with the desired transmission shift position is less than the potentiometer value associated with the current motor position. If yes, as set forth in decision blocks 572 and 576, the subroutine next ascertains whether the motor is running and if yes, whether the electric motor 55 is running in the correct direction. If the electric motor 55 direction is not correct, the subroutine flows to function block 580 where it stops operation of the motor, sets the direction reversal timeout bit discussed above and cycles to the top of the subroutine. At the end of the time delay associated with the direction reversal time out bit, the subroutine returns to decision block 572 to determine whether the motor is running. Since motor operation was stopped in function block 580, the subroutine flows from decision block 572 to function block 584 wherein the fail/safe relay is reconnected thus enabling operation of the electric motor 55. The function block 584 also reverses direction of the electric motor 55 and stores the potentiometer value associated with the current position of the slidable element 90 for use by the stall check subroutine discussed above. The subroutine loops back onto itself until as set forth in decision block 564, it ascertains that the electric motor 55 has caused the slidable element 90 to travel to a potentiometer value within tolerance of the potentiometer value stored in the motor destination register. At that point, the subroutine flows to function block 588 wherein it shuts off the electric motor 55, disconnects the drive output electronics from the motor windings by releasing a fail/safe relay and sets the no action bit.

Referring again to decision block 568, if the motor destination is greater than the current motor position, the subroutine flows to decision blocks 592 and 596 and function blocks 600 and 604 and performs the same functions as mentioned above. Once the subroutine ascertains that the electric motor 55 has caused the slidable element 90 to travel to a potentiometer value within tolerance of the potentiometer value stored in the motor destination register, it shuts off the electric motor 55, disconnects the drive output electronics from the motor windings by releasing a fail/safe relay and sets the no action bit.

Figure 25:
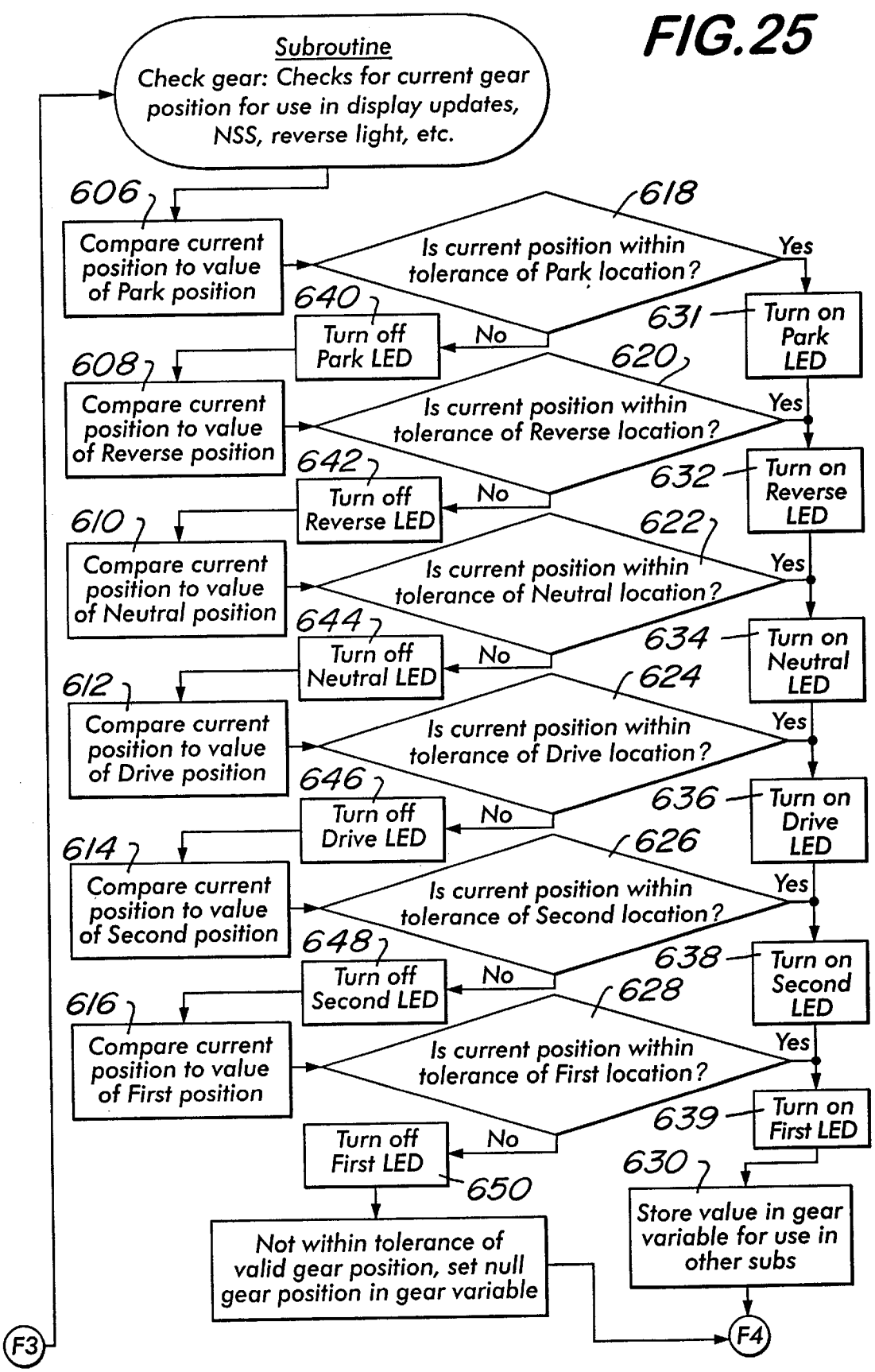
FIG. 25 is a flowchart for determining the current gear position storing that position for use by the shifting apparatus in accordance with the present invention; and, FIG. 26 is a flowchart for enabling or disabling a neutral safety switch in accordance with the present invention.

Referring now to FIG. 25, a subroutine is shown therein which determines the current gear position and stores a potentiometer value in a gear variable associated with that position for use by other subroutines. The subroutine also updates the display lamps 212 located on the key pad 45. As set forth in the subroutine function blocks 606, 608, 610, 612, 614 and 616, the subroutine compares the potentiometer value associated with the current position of the slidable element 90 with the potentiometer values that have been associated with the various transmission shift positions during the calibration step. As set forth in decision boxes 618, 620, 622, 624, 626 and 628, the subroutine ascertains whether the current value is within the tolerance of a stored potentiometer value associated with one of the transmission shift positions. If the current value is within tolerance of one of the stored values, the subroutine flows to function block 630 and stores the value in a gear variable for use in other subroutines, e.g., a control reverse lights subroutine discussed below. Further, as set forth in function blocks 631 through 650, upon ascertaining the current value to be within the tolerance of one of the stored potentiometer values, the subroutine turns on the display lamp 212 associated with the corresponding transmission shift position and turns off all remaining display lamps.

As previously discussed, when in the Shift mode, the software 203 will not permit shifting unless certain safety conditions are satisfied. For example, as set forth in the decision and function blocks of FIG. 13, the subroutine will not permit a shift into low 1 if the vehicle speed exceeds fifteen m.p.h. and will not permit a shift into low 2 if the vehicle speed exceeds thirty m.p.h. As set forth in function block 654, under such circumstances, the subroutine clears the key value and activates the audible alarm to emit a predetermined beep tone, e.g., three beeps, notifying the vehicle driver that an invalid key value has been inputted. The shifting apparatus also monitors for an output signal in response to actuation of the vehicle brake mechanism. Accordingly, the Shift subroutine prohibits shifting out of park or reverse unless the microprocessor has received that output signal and vehicle speed is 6 m.p.h. or less. Unless these conditions are met, the subroutine activates the audible alarm to emit a signal alerting the vehicle driver that an invalid key value has been inputted.

Figure 23:
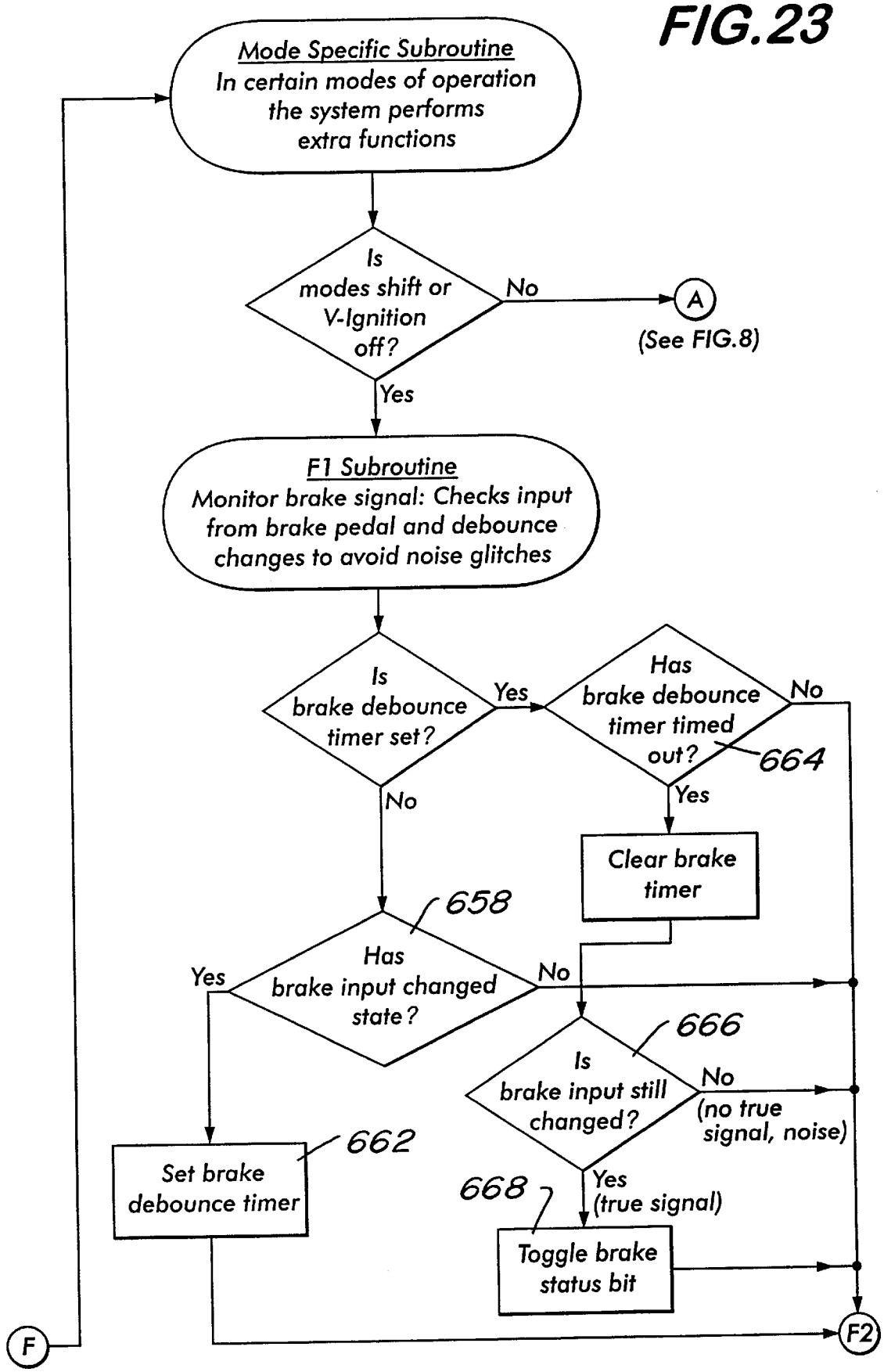
FIG. 23 is a flowchart showing a process for determining whether to set a brake status bit.
Figure 24:
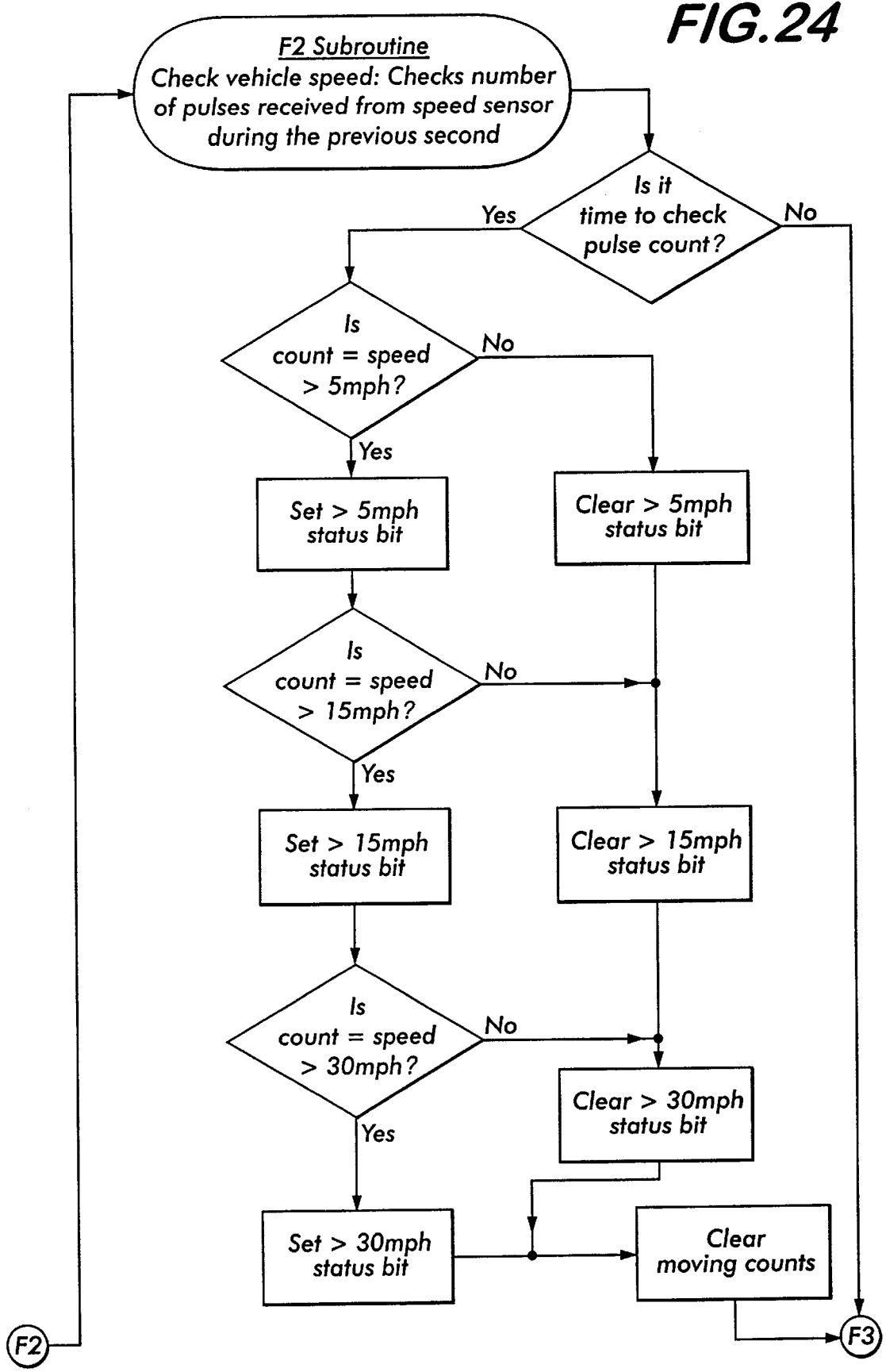
FIG. 24 is a flowchart showing a process for setting status bits corresponding to the motor vehicle's speed.

For determining vehicle speed or whether the brake pedal 30 has been depressed, the Shift subroutine refers to other subroutines within the software 203 that are active only during operation in the Shift mode. Specifically, for determining vehicle speed, the Shift subroutine checks status bits set in a Vehicle Speed subroutine set forth in FIG. 24. As set forth therein, at predetermined time intervals, the Vehicle Speed subroutine checks inputs received from the vehicle speed sensor 230 which is coupled to the vehicle transmission and provides a signal representative of contemporaneous operating speed. The subroutine then sets or clears 5 mph, 10 mph and 15 mph status bits based upon the pulse counts detected. To determine whether the brake signal is active, the Shift subroutine checks a status bit set in a brake signal monitoring subroutine set forth in FIG. 23. As set forth therein at decision block 658 and function block 662, once the subroutine determines that a change has been made in the brake input state, such as when the brake pedal 30 has been depressed, it sets a debounce timer to elapse at a predetermined period of time. The debounce timer is utilized for timing the duration of the state change of the brake input which typically lasts between 150 and 200 milliseconds, to distinguish a genuine brake signal resulting from the vehicle driver depressing the brake pedal 30 from noise in the system. As set forth in decision blocks 664 and 666, the subroutine ascertains whether the brake input state has remained changed after the predetermined time period of the debounce timer has elapsed. If yes, as set forth in function block 668, the subroutine toggles the brake status bit to indicate whether the braking mechanism pedal 30 has been depressed.

Figure 14:
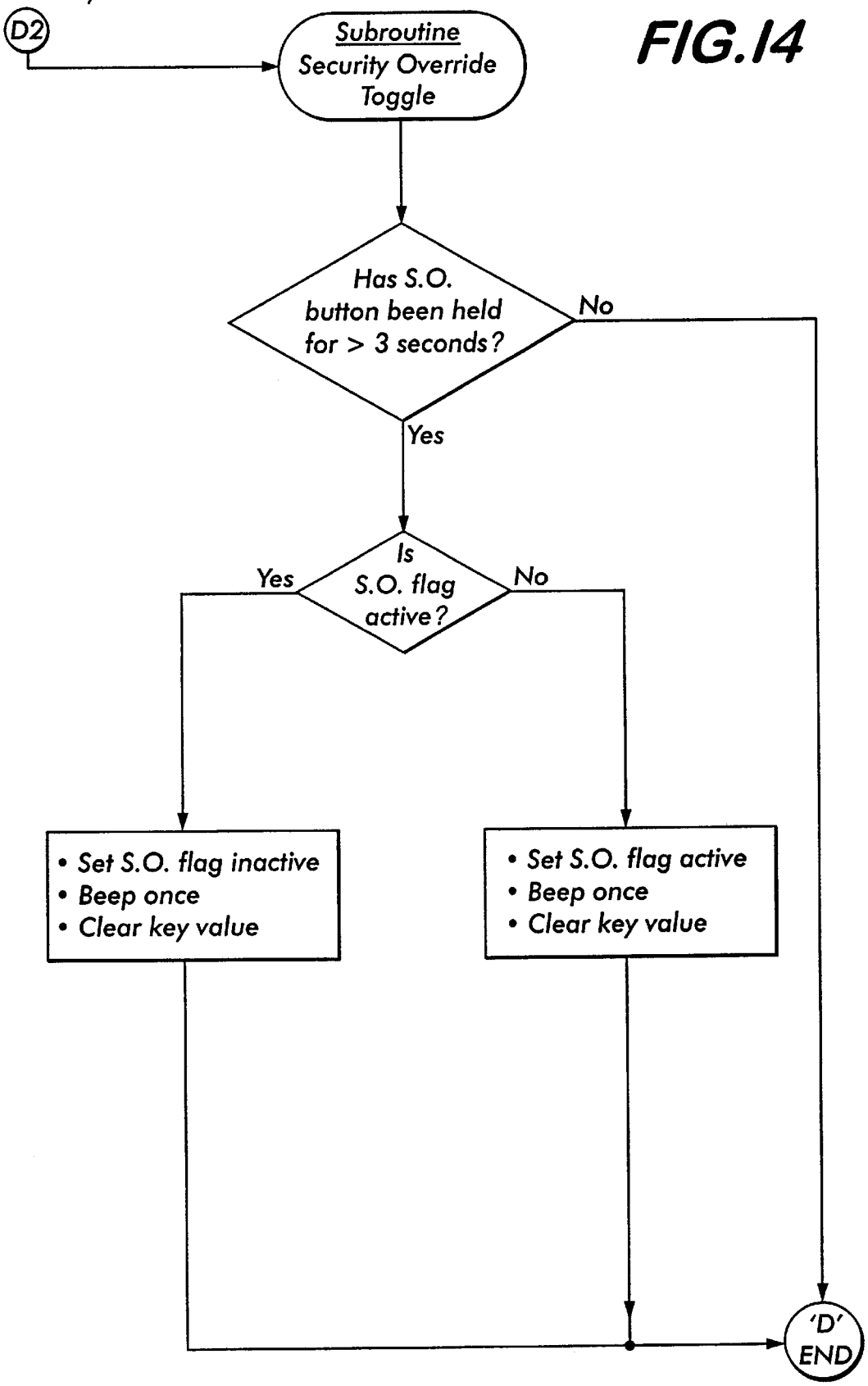
FIG. 14 is a flowchart showing a process for overriding the security mode of the shifting apparatus of the present invention.

Referring again to FIG. 12 at 548, once a driver has entered a valid identification code and the software 203 has entered the Shift mode, he or she has the ability to override operating in the Security mode by simply depressing the key designated "S" and holding the key down for a predetermined interval of time, e.g., three seconds. While in Security Override mode, it is unnecessary for the driver to reenter a valid identification code each subsequent time he or she restarts the car by turning the ignition switch 265 to the "crank" position. In other words, when in Security Override mode, the software 203 will set to the Shift mode and enable the driver to turn the ignition switch 265 to "crank" and enable operation in the Shift mode without entry of a identification code. For example, if the driver leaves his vehicle in a garage each night after use where he or she feels it is safe from theft, by utilizing the Security Override mode, the driver avoids having to reenter an identification code each morning to start the vehicle. Likewise, the Security Override mode may be deactivated by simply depressing the "S" key and holding it down for a predetermined interval of time, e.g., three seconds. Once returned to the Security mode, the driver must enter a valid identification code to turn the ignition switch to "crank" and enable operation in the Shift mode. As shown in FIG. 12 when the "S" key is depressed in the Shift mode, the software flows to subroutine D2 set forth in FIG. 14. Upon depression of the key designated "S", the software 203 flows to the Security Override (S.O.) subroutine set forth at FIG. 14 wherein as set forth in the decision and function blocks set forth therein, the subroutine determines whether the key has been depressed for the predetermined interval of time. If yes, a Security Override flag is activated overriding the Security mode. Likewise, under Security Override subroutine, upon depression of the "S" key while in the Security Override mode, the subroutine ascertains whether the key has been depressed for the predetermined interval of time. If yes, the Security Override flag is set to inactive.

Also, while in the Shift mode, the software 203 provides the driver with the ability to reactivate Security mode while in park with the vehicle running. For example, during cold winter months, the driver may wish to exit the vehicle while in park to perform a task of short duration, e.g., visit a supermarket, and may wish to keep the engine running to maintain warmth within the vehicle. Under the invention, the driver may place the car in park by depressing the "P" key 212 once. Once in park, the driver may again depress the "P" key 212 for a predetermined interval of time, e.g., three seconds, to leave the Shift mode and reenter the Security mode. Once in Security mode, return to the Shift mode to shift out of park requires entry of a valid identification code. Thus, through operation of this mode, theft of the vehicle while running in park is prevented.

Figure 15:
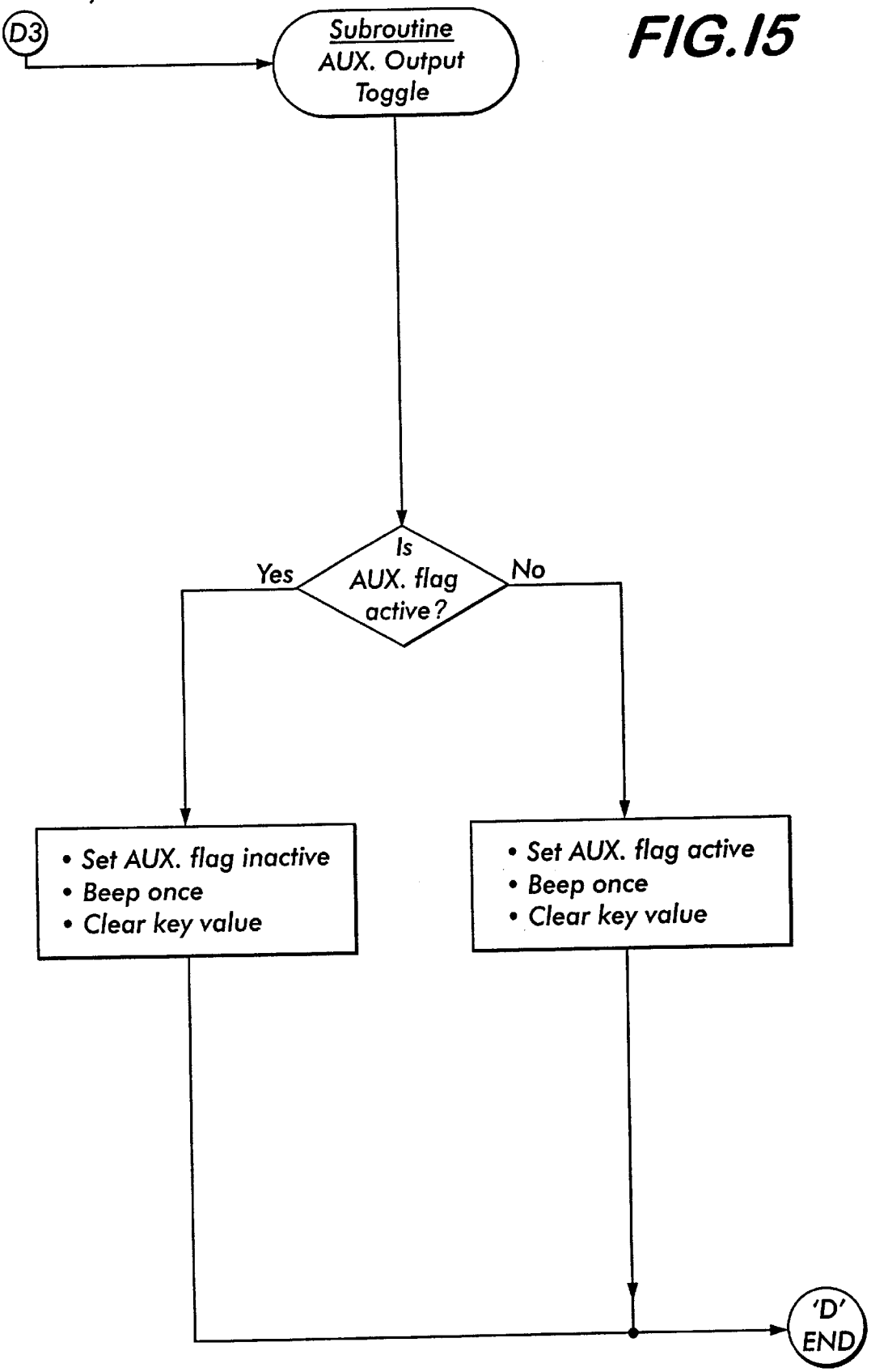
FIG. 15 is a flowchart showing a process for toggling of an AUX output relay in accordance with the shifting apparatus of the present invention.

Finally, under Shift mode, the vehicle driver has the ability to provide power to accessory components such as an additional passenger compartment lamp by depressing the key designated "A" while in Shift mode. Upon depression of the key designated "A", the software 203 flows to the Auxiliary Output subroutine set forth at FIG. 15 wherein as set forth in the decision and function blocks therein, the subroutine determines whether an auxiliary flag is active. If the auxiliary flag is not active, the subroutine sets the auxiliary flag to active thus providing power to the accessory component. Conversely, if the flag is active, upon depression of the key designated "A", the subroutine sets the auxiliary flag to not active thus removing power from the accessory component.

Figure 28:
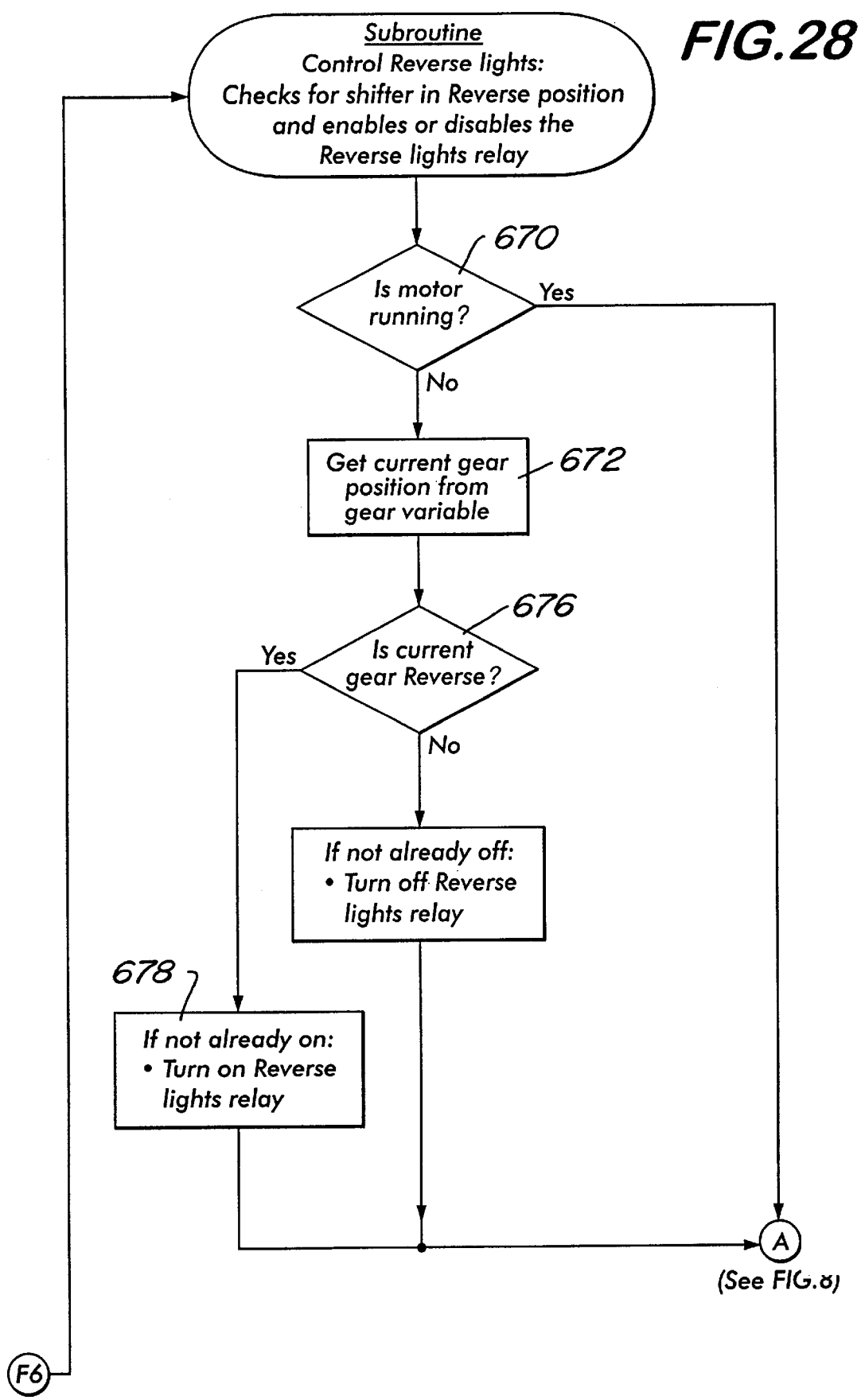
FIG. 28 is a flowchart disclosing a subroutine for controlling illumination of vehicle reverse lights.

Referring now to FIG. 28, there is disclosed therein a subroutine which controls illumination of the vehicle reverse lights. Under decision block 670, the subroutine ascertains whether the motor is running. If yes, as set forth in function block 672, the subroutine next determines the current gear position by retrieving the current gear variable set in the subroutine for determining the current gear position (FIG. 25). Under decision block 676, the subroutine ascertains whether the current gear position is reverse and if yes, under function block 678, closes a reverse lights relay to illuminate the vehicle reverse lights.

Returning to FIG. 1, there is shown mounted to the steering wheel 20 an up-arrow key 700 and a down-arrow key 702. Referring now to FIGS. 1 and 6A, the up and down arrow keys 700 and 702 are connected to the controller 200 through a cable assembly 704 that connects to the controller at a position designated on the controller face plate 208 as "Shift Direction." The up-arrow and down-arrow keys 700 and 702 are enabled for utilization only when the software 203 is set in the Shift mode and provide the driver with a means to shift transmission positions without having to actuate keys on the key pad 45. By depressing the up-arrow and down-arrow keys, 700 and 702, the driver may step through the various transmission positions, one-by-one, until the desired shift position has been reached. The up-arrow and down-arrow keys 700 and 702 may be of particular utility for a handicapped driver not having use of a limb that otherwise would be used for depressing keys on the key pad 45.

Each subsequent time the up-arrow or down-arrow key is depressed, the transmission shifts to the next transmission position as indicated on the face of the key pad 45. For example, if the vehicle transmission is in the park shift position with the park key "P" being illuminated and the driver wishes to shift from park into reverse, rather than depressing the reverse key "R" on the key pad 45, the driver may simply depress the down-arrow key 702 once. Upon depressing this key once, the shifting apparatus 10 will shift the transmission 35 from the park shift position to the reverse shift position. Shifting from park shift position to reverse shift position requires only one press of the down-arrow key 702 since as shown on the key pad 45 (FIG. 6B), reverse is one step down from park. The display lamp associated with the "P" key will turn off and the display lamp associated with the reverse key "R" will illuminate. Likewise, if the vehicle transmission is in the drive shift position (with the drive key "D" being illuminated on the key pad 45) and the driver wishes to shift from drive into park, rather than depressing the park key "P" on the key pad 45, the driver may simply depress the up-arrow key 702 three times to get to park. As shown on the key pad 45 in FIG. 6B, the park key "P" is three steps below the drive key "D". Thus, in order to shift from drive to park, the driver must shift up through neutral "N" and reverse "R" thus requiring the driver to depress the up-arrow key 700 three times. Upon depressing the up-arrow key 702 three times, assuming all safety conditions have been met, the transmission will shift from drive to park.

Referring now to FIGS. 1, 1A and 1B, the steering wheel 20 includes a central portion 709 that is mounted to a rotatable portion 710 of a steering column. As best shown in FIG. 1B, the rotatable portion 710 is disposed within a fixed portion 712 of the steering wheel. The rotatable and fixed portions of the steering column are axially aligned with one another and with a non-rotatable shaft 714 disposed therethrough. Concentrically mounted to the outside surface of the shaft 714 are a plurality of conductive slip rings 716 which are electrically connected to the cable assembly 704 through a plurality of conductors 718. The slip rings 716 may be formed of any suitable electrically conductive material, e.g., copper. The cable 704 is mounted to the fixed portion 712 of the steering column by any suitable means, e.g., a rubber grommet 720. The up-arrow and down-arrow keys 700 and 702 are fixedly secured to the circular steering wheel 20 by any suitable means, e.g., mounting hardware. A conducting wire 706 extends from each key 700 and 702 through the central portion 709 of the steering wheel 20 and through the rotatable portion of the steering column 710. Disposed on the opposite end of each conducting wire 706 is an electrically conductive brush 722, each brush 722 being in electrical contact with one of the slip rings 716. Thus, as the steering wheel 20 is turned during operation of the vehicle, the conductive brushes 722 travel along the fixed slip rings however remain frictionally engaged with the slip rings at all times thus providing continuous electrical contact for the sending of control signals from the up-arrow and down-arrow keys 700 and 702 to the controller 200.

What is claimed is:

1. A shifting apparatus for use with a motor vehicle having an automatic transmission of the type including a shift position select lever to selectively shift the transmission from a present transmission shift position to one of a plurality of desired transmission shift positions, said apparatus comprising:
   a. an operator input means adapted to be mounted in the passenger compartment of the vehicle and including a plurality of keys accessible for actuation by the vehicle operator and corresponding respectively to said desired transmission shift positions and generator means operative in response to operator actuation of each said key to generate an operator signal representative of said desired transmission shift position;
   b. an actuator module adapted to be mounted on the housing of the transmission proximate the shift position select lever and comprising a motor means adapted to be drivingly connected to the shift position select lever and a variable resistance circuit, said circuit arranged to maintain a resistance value representative of said present transmission shift position;
   c. a processor means including a comparator means for determining said present transmission shift position by measuring the resistance value of said circuit and being operative in response to receipt of an operator signal representative of a desired transmission shift position differing from said present transmission shift position to energize said electric motor assembly to move the shift position select lever to a position corresponding to said desired transmission shift position and operative in response to detecting said present transmission shift position matching said desired transmission shift position to de-energize said electric motor assembly.

2. The shifting apparatus of claim 1 wherein said actuator module comprises a DC motor and a speed reduction assembly coupled to the output shaft of said DC motor and wherein said actuator module further comprises a lever means interconnecting the output shaft of said speed reduction assembly to the free end of the shift position select lever.

3. The shifting apparatus of claim 2 wherein said lever means comprises a first lever section connected at one end thereof to said output shaft of said speed reduction assembly and a second lever section connected at one end thereof to the free end of said first lever section and connected at its free end to the free end of the shift position select lever, said second lever section being selectively axially moveable with respect to said first lever to selectively vary the effective length of said lever means.

4. The shifting apparatus of claim 3 wherein said first lever section comprises an elongated threaded shaft and wherein said second lever section comprises an internally threaded ball element disposed over said threaded shaft.

5. The shifting apparatus of claim 4 wherein said first and second lever sections are formed of heat treated steel.

6. The shifting apparatus of claim 1 wherein said actuator module further comprises a bracket adapted for mounting to the housing of the transmission.

7. The shifting apparatus of claim 6 wherein said bracket is adapted to be positioned generally horizontally at one end of the transmission housing.

8. The shifting apparatus of claim 3 additionally comprising a housing disposed over the length of said threaded shaft, said variable resistance circuit comprising first and second linear conductor segments disposed on said housing, said segments being oriented substantially parallel to the direction of axial movement of said lever sections and being separated from one another, said variable resistance circuit further comprising a bridging conductor disposed on said second lever and arranged for axial movement therewith, said bridging conductor being in electrical contact with said segments to complete said circuit, the resistance of said circuit varying based upon the position of said bridging conductor between said conductor segments.

9. The shifting apparatus of claim 8 wherein said housing additionally comprises a longitudinal slot, said bridging conductor being disposed through said slot.

10. The shifting apparatus of claim 8 wherein a first end of said first linear conductor segment forms a first terminal and wherein a first end of said second linear conductor segment forms a second terminal, said comparator means being linked to said first and second terminals to obtain resistance characteristics of said variable resistance circuit.

11. The shifting apparatus of claim 10 wherein said segments are disposed on an inside surface of said housing.

12. The shifting apparatus of claim 8 wherein said bridging conductor further comprises electrical contact brushes arranged for contact with said first and second linear conductor segments.

13. The shifting apparatus of claim 1 wherein said operator input means is adapted to be mounted within an opening in the instrument panel of the vehicle.

14. The shifting apparatus of claim 1 additionally comprises a controller, said comparator means being housed therein, said controller being adapted to be mounted within the motor vehicle remote from, but electrically interconnected to, the operator input means and said actuator module.

15. The shifting apparatus of claim 3 wherein said output shaft of said speed reduction assembly further comprises a worm gear and wherein said one end of said first lever section further comprises a worm wheel driven by said worm gear.

16. The shifting apparatus of claim 2 wherein said speed reduction assembly includes a housing defining a sealed, interior chamber.

17. The shifting apparatus of claim 1 wherein said operator input means comprises a housing structure defining a front face and wherein each of said keys comprises a push button.

18. The shifting apparatus of claim 1 additionally comprising processor means and vehicle speed detecting means coupled to the vehicle transmission for providing a signal representative of contemporaneous vehicle operating speed, wherein said processor means performs arithmetic operations to prevent shifting to a desired transmission shift position when the vehicle exceeds a predetermined speed.

19. The shifting apparatus of claim 18 wherein said desired transmission shift position is low 2 and the vehicle speed exceeds thirty miles per hour.

20. The shifting apparatus of claim 19 wherein said desired transmission shift position is low 1 and the vehicle speed exceeds fifteen miles per hour.

21. The shifting apparatus of claim 1 wherein the motor vehicle further includes a brake mechanism and wherein one of said present transmission shift positions is park and wherein said apparatus further comprising processor means and sensor means, said sensor means for providing an output signal in response to actuation of a vehicle brake mechanism, said processor means performing arithmetic operations so as to prevent shifting from park unless having received said output signal.

22. The shifting apparatus of claim 1 wherein the motor vehicle further includes a brake mechanism and wherein one of said present transmission shift positions is reverse and wherein said apparatus further comprising processor means and sensor means for providing an output signal in response to actuation of a vehicle brake mechanism, said processor means performing arithmetic operations so as to prevent shifting from reverse unless having received said output signal.

23. The shifting apparatus of claim 14 wherein said vehicle additionally includes a steering wheel and wherein said apparatus additionally comprising at least one arrow key adapted to be mounted on the steering wheel, said arrow key being electrically connected to said controller and being operative in response to operator actuation to generate a signal representative of a desired transmission shift position.

24. The shifting apparatus of claim 23 wherein said at least one arrow key comprises an up-arrow key and a down-arrow key.

25. The shifting apparatus of claim 1 wherein said operator input means further comprises an audible alarm for emitting an audible signal alerting the vehicle driver of various operating conditions.

26. The shifting apparatus of claim 1 wherein said operator input means further comprises display lamps associated said keys, said display lamps arranged for flashing intermittently or remaining continuously illuminated alerting the vehicle driver of various operating conditions.

27. The shifting apparatus of claim 26 wherein said display lamps are arranged for being illuminate continuously or for flash intermittently.

28. The shifting apparatus of claim 1 wherein said shifting apparatus may be set in a jog mode wherein upon actuation of a first key of said operator input means, said actuator module may be utilized to control precise movement of the shift position select lever in a first direction and upon actuation of a second key of said operator input means, said actuator module may be utilized to control precise movement of the shift position select lever in a second direction opposite said first direction.

29. The shifting apparatus of claim 1 wherein said shifting apparatus may be set in a security mode wherein said operator input means comprises a plurality of keys accessible for receiving a user code and wherein said processor means comprises storage means for storing one or more identification codes, said processor means being operably coupled to said operator input means for receiving signals therefrom indicative of a user code wherein the processor provides an output signal if the user code is identical to one of said previously stored identification codes, said apparatus further comprising a controlled device operably connected to said processor means and allowing the vehicle to start when the output signal from said processor means is received.

30. The shifting apparatus of claim 29 wherein said controlled device is a starter motor.

31. The shifting apparatus of claim 29 wherein one of said identification codes is a personal identification code programmed by the vehicle driver.

32. The shifting apparatus of claim 29 wherein said identification code is a factory identification code.

33. The shifting apparatus of claim 29 wherein said storage means is a non-volatile memory.

34. The shifting apparatus of claim 33 wherein said non-volatile memory is an EEPROM.

35. The shifting apparatus of claim 29 wherein said operator input means comprises a key pad.

36. The shifting apparatus of claim 29 wherein said apparatus may be set in a program mode to receive a plurality of signals from said operator input means in seriatim indicative of a personal identification code that may be stored in said storage means.

37. The shifting apparatus of claim 36 wherein said processor provides an output signal to serve as notification that the apparatus has accepted said personal identification code.

38. The shifting apparatus of claim 37 wherein upon acceptance of said personal identification code, said shifting apparatus may be set in a verification mode to receive a plurality of verification signals from said operator input means in seriatim and compare said verification signals with said accepted personal identification code and provide an output signal notifying that the apparatus has verified the accepted personal identification code if said code matches said verification signals.

39. The shifting apparatus of claim 1 additionally comprising storage means and wherein said shifting apparatus may be set in a calibrate mode wherein upon actuation of an active key of said operator input means, said processor means reads a resistance value associated with the present transmission shift position and stores that value in association with said actuated key in said storage means.

40. The shifting apparatus of claim 29 wherein said apparatus may be set in a security override mode after said vehicle has been started by entry of a user code identical to one of said previously stored identification codes wherein upon actuation of an active key of said operator input means for a predetermined period of time, said apparatus may be overridden thus allowing the vehicle to be restarted without entry of a user code.

41. The shifting apparatus of claim 40 wherein said predetermined period of time is three seconds.

42. The shifting apparatus of claim 29 wherein said processor provides an output signal to serve as notification that a user code has been entered that is identical to one of said previously stored identification codes.

43. The shifting apparatus of claim 29 wherein once the vehicle has been started by entry of a user code that is identical to one of said previously stored identification codes, during operation, said apparatus may be reset to security mode by while in park and depressing an actuated key for a predetermined time interval.

* * * * *